United States Patent [19]
Yoshizawa et al.

[11] Patent Number: 5,182,967
[45] Date of Patent: Feb. 2, 1993

[54] LEVER APPARATUS HAVING A FREELY MOVABLE FULCRUM AND MECHANICAL APPARATUS USING THE SAME

[75] Inventors: Yasuo Yoshizawa; Mitsuo Kato, both of Yonezawa, Japan

[73] Assignee: Yoshiki Industrial Co., Ltd., Yamagata, Japan

[21] Appl. No.: 635,517

[22] PCT Filed: Jun. 6, 1990

[86] PCT No.: PCT/JP90/00737
§ 371 Date: Feb. 4, 1991
§ 102(e) Date: Feb. 4, 1991

[87] PCT Pub. No.: WO90/15268
PCT Pub. Date: Dec. 13, 1990

[30] Foreign Application Priority Data
Jun. 8, 1989 [JP] Japan .................. 1-146304

[51] Int. Cl.$^5$ .................. F16H 21/44; G05G 1/04
[52] U.S. Cl. .................. 74/834; 74/522; 74/828
[58] Field of Search .................. 74/522, 828, 834

[56] References Cited

U.S. PATENT DOCUMENTS

| | | | |
|---|---|---|---|
| 1,271,568 | 7/1918 | Hall | 74/522 |
| 2,106,068 | 1/1938 | Sirch | 74/522 |
| 2,491,548 | 12/1949 | Branson | 74/522 |
| 3,613,465 | 10/1971 | Wood | 74/522 X |
| 4,475,374 | 10/1984 | Sakai et al. | 74/54 X |
| 4,702,428 | 10/1987 | Kempster | 74/834 X |

FOREIGN PATENT DOCUMENTS

| | | |
|---|---|---|
| 52-19865 | 2/1977 | Japan .................. 74/834 |
| 52-8466 | 3/1977 | Japan . |
| 53-19147 | 6/1978 | Japan . |
| 55-8767 | 2/1980 | Japan . |
| 62-29156 | 6/1987 | Japan . |

Primary Examiner—Leslie A. Braun
Assistant Examiner—Julie Krolikowski
Attorney, Agent, or Firm—Frishauf, Holtz, Goodman & Woodward

[57] ABSTRACT

A lever member (1) is pivotally supported on a shaft for a roller (2) which is in rolling contact with a guide plate (3). One end of the lever member (1) is connected to a force point regulator (4), and the other end of the lever member is connected to an action point regulator (6).

7 Claims, 28 Drawing Sheets

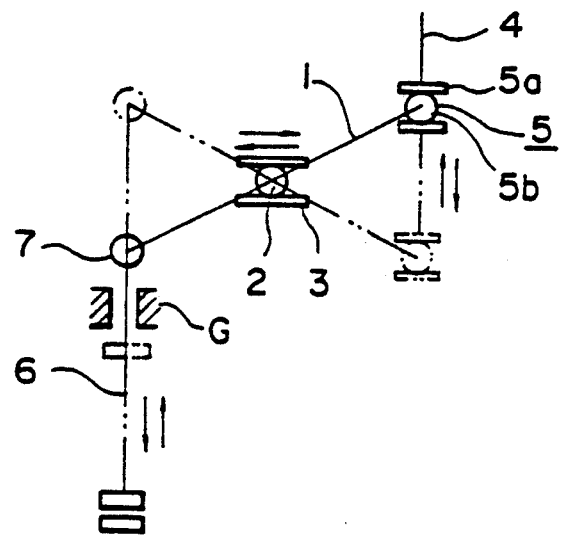
F I G. 3

LEVER APPARATUS HAVING A FREELY MOVABLE FULCRUM AND MECHANICAL APPARATUS USING THE SAME

TECHNICAL FIELD

The present invention relates to a lever apparatus and, more particularly, to a lever apparatus having a movable fulcrum and a mechanical apparatus using the same.

BACKGROUND ART

Lever apparatuses have been generally used in a mechanical field such as machine tools and industrial machines and widely used as force transmitting parts of movable mechanisms in various other structures. As shown in FIGS. 1A and 1B, in such a lever apparatus, a force point c is provided at one end of a lever member a axially supported by a fulcrum b fixed on the ground G. The lever member a is pivoted by means of a crank arm g connected to a driving wheel f, so that a work force is generated at an action point d.

In the conventional lever apparatus, since the lever member a is axially supported on the fixed fulcrum b, the loci of both the force point c and the action point d draw arcs upon pivotal movement of the lever member a. Even if a vertical force acts on the force point c, as shown in FIG. 1A, this force cannot be applied along a single straight line. This problem is also posed at the action point d. For this reason, in the conventional lever apparatus, in order to convert linear motion of the force point c into pivotal motion of the lever member a or convert pivotal motion of the lever member a into linear motion at the action point d, a force point regulator as a combination of an elongated hole Lc and a roller Rc and an action point regulator as a combination of an elongated hole Ld and a roller Rd, as shown in FIG. 1A, are used at portions of the force point c and the action point d, respectively. Ranges W of motion to be converted are determined by the lengths of the elongated holes Lc and Ld, respectively, and the ranges W cannot be increased due to limitations of mechanical strength. As far as the force transmission magnitudes are concerned, distances A1 and B1 from the fulcrum b to the force and action points c and d are changed upon pivotal movement of the lever member a, and a transmission force is undesirably changed.

A torsion stress is produced at the action point d upon pivotal movement of the lever member a by a pivot angle α in a direction indicated by an arrow in FIG. 1B. Therefore, a force cannot be effectively transmitted.

In an example shown in FIG. 2, when a force is to act at a point c to shift an action point d downward, an upper portion of an action point link member g is distorted in a direction to be bent as indicated by a dotted line. As a result, a left portion of an upper end and a right portion of a lower end of a guide hole of a support guide member i are worn out.

DISCLOSURE OF INVENTION

It is, therefore, an object of the present invention to provide a lever apparatus capable of increasing a range of motion for converting force transmission directions at force and action points and capable of transmitting a large force with high precision, and a mechanical apparatus using this lever apparatus.

In order to achieve this object of the present invention, there is provided a lever apparatus having a large degree of freedom of force transmission directions at the force and action points such that the fulcrum of the lever apparatus pivotally supported at a stationary point in a conventional structure is movably pivoted.

A press apparatus using the lever apparatus of the present invention comprises a lever member pivotally supported at a fulcrum, a fulcrum point guide member for freely movably supporting the fulcrum of the lever member, a drive mechanism, connected to the lever member, for applying a driving force to a force point of the lever member, and a head connected to an action point of the lever member and driven upon operation of the lever member.

Extensive studies have been made on operations of lever apparatuses. As a result, the present inventors found that since the fulcrum which supports the lever member in the conventional lever apparatus was stationary, and the lever member was pivoted about an axis passing through this stationary fulcrum, the lever member itself wa restricted to motion defined by the stationary fulcrum. In consideration of this point, the present inventor developed a lever apparatus wherein a fulcrum which supported a lever member was freely moved about a movable fulcrum (to be referred to as a freely movably fulcrum hereinafter) as the center. Since the fulcrum position of the lever apparatus according to the present invention is freely movable and pivotal movement of the lever member is performed, the fulcrum of the lever member is freely moved in accordance with motion of a force point regulator connected to the lever member and motion of an action point regulator. Therefore, the degree of freedom of motion of the force point regulator and motion of the action point regulator can be set to be large.

BRIEF DESCRIPTION OF DRAWINGS

FIGS. 3 to 6 are schematic views showing arrangements of different embodiments of lever apparatuses according to the present invention;

BEST MODE OF CARRYING OUT THE INVENTION

Figure 1A:
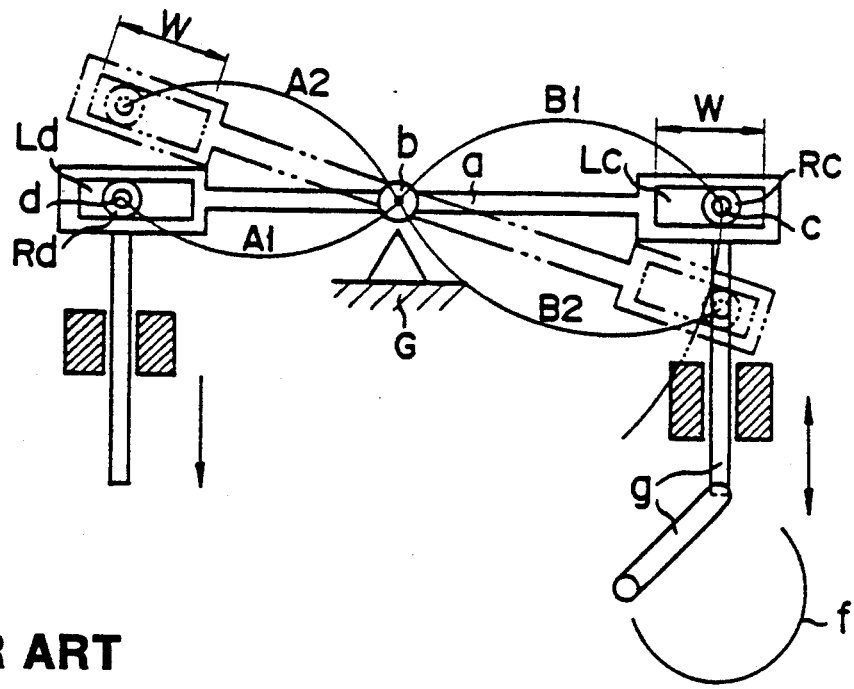
FIGS. 1A, 1B, and 2 are views showing conventional lever apparatuses.
Figure 1B:
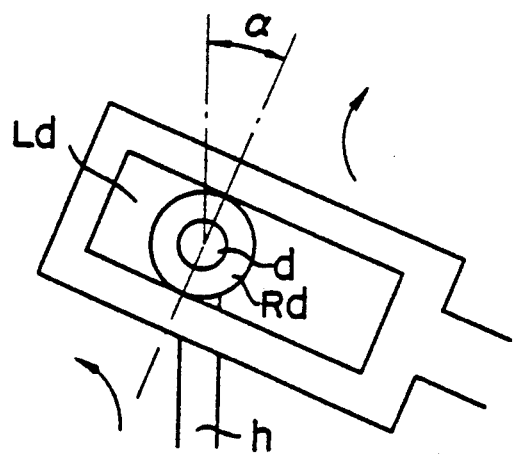
Figure 2:
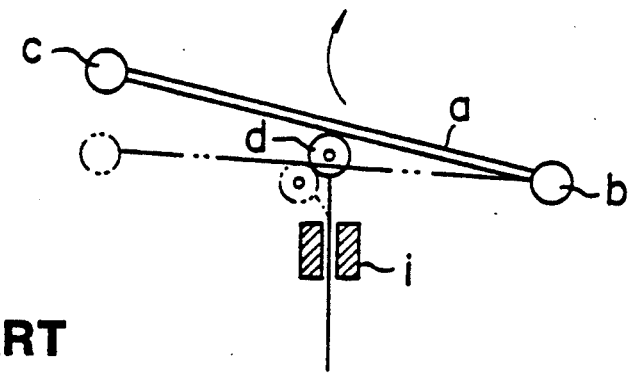

Embodiments of the present invention will be described below.

A preferred embodiment of a freely movable fulcrum type lever apparatus according to the present invention will be briefly described with reference to FIGS. 3 to 6.

Referring to FIGS. 3 to 6, reference numeral 1 denotes a lever member; 2, a fulcrum member for pivotally supporting the lever member 1; 3, a fulcrum guide member for freely movably supporting the fulcrum member 2; 4, a force point regulator pivotally and movably connected to a force point, or one end of the lever member 1 through a connecting member 5; and 6, an action point regulator pivotally connected to an action point, or the other end of the lever member 1 through a connecting member 7. Note that the connecting member 5 for connecting the lever member and the force point regulator 4 is preferably constituted by a known cam follower type member having a roller 5b which is in rolling contact between a pair of guide plates 5a.

In each of the embodiments shown in FIGS. 3 to 6, the force point regulator 4 is linearly and vertically moved, and the guide member 3 linearly, horizontally, and rollingly supports the roller type fulcrum member 2 axially supported on the lever member 1.

Figure 4:
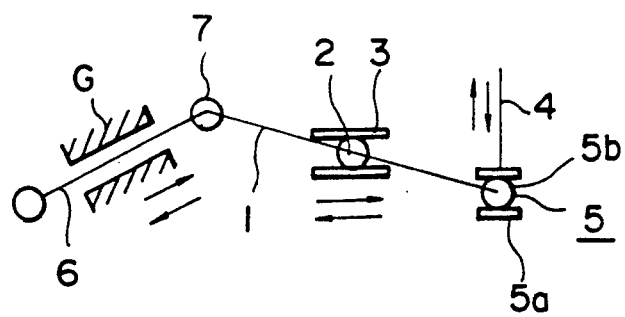

Each of the embodiments shown in FIGS. 3 and 4 employs an internal fulcrum obtained by locating the fulcrum member 2 between the force point 5 and the action point 7 of the lever member 1. In the embodiment shown in FIG. 3, the action point regulator 6 can be vertically and linearly moved, as indicated by a locus in FIG. 7. That is, when the force point regulator 4 is vertically driven, the lever member 1 is pivoted about the fulcrum member 2. At this time, the fulcrum member 2 of the lever member 1 is horizontally moved by a distance X along the guide member 3 upon pivotal movement of the lever member 1, so that the action point regulator 6 is linearly and vertically moved. In the embodiment shown in FIG. 4, the action point regulator 6 is obliquely and linearly moved. In this embodiment, a connecting member disposed at the action point of the lever member 1 is subjected to elliptical motion.

Figure 7:
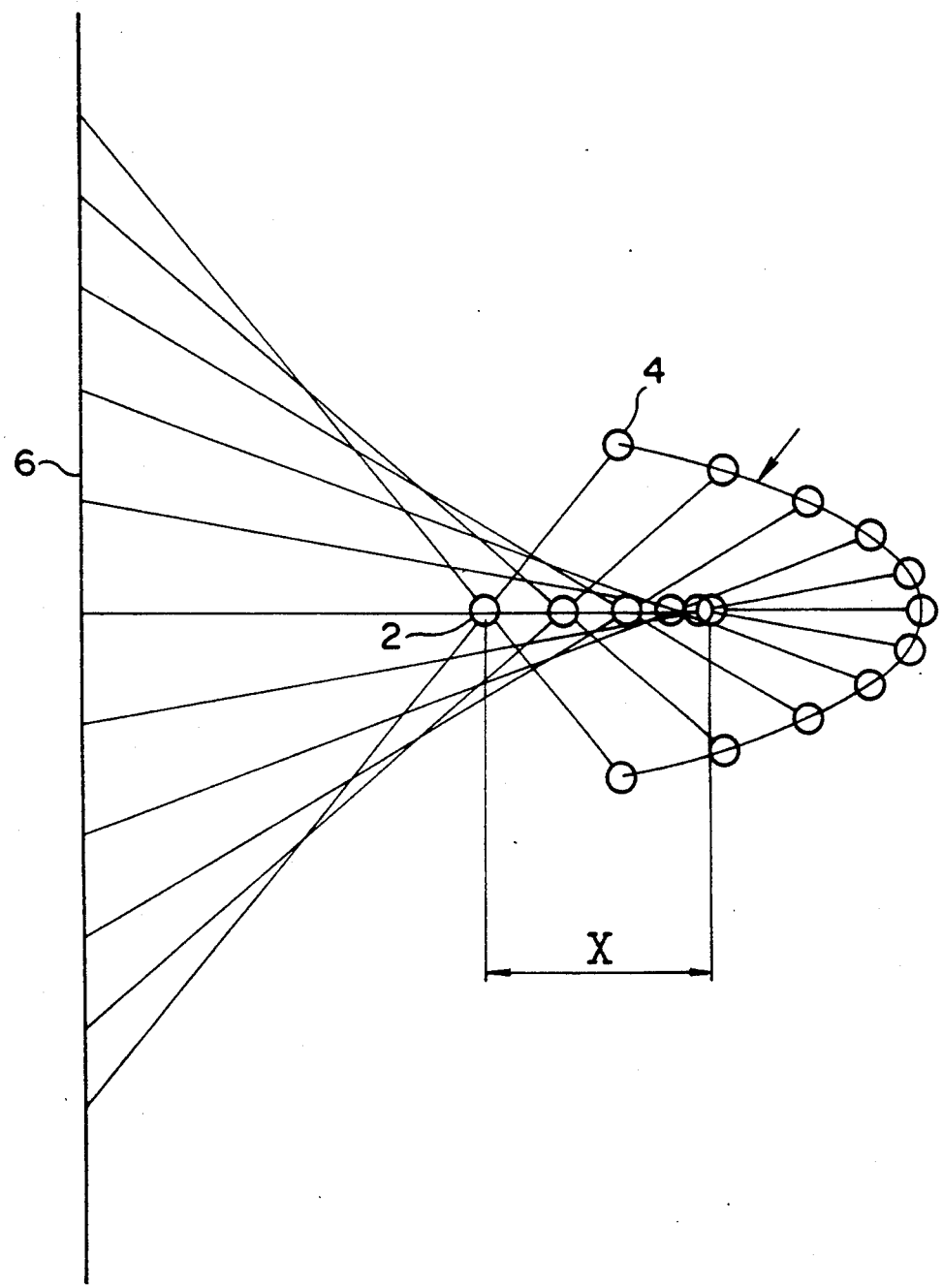
FIGS. 7 to 12 are views showing loci of a fulcrum, a force point, and an action point to explain an operation of the lever apparatus according to the present invention.
Figure 8:
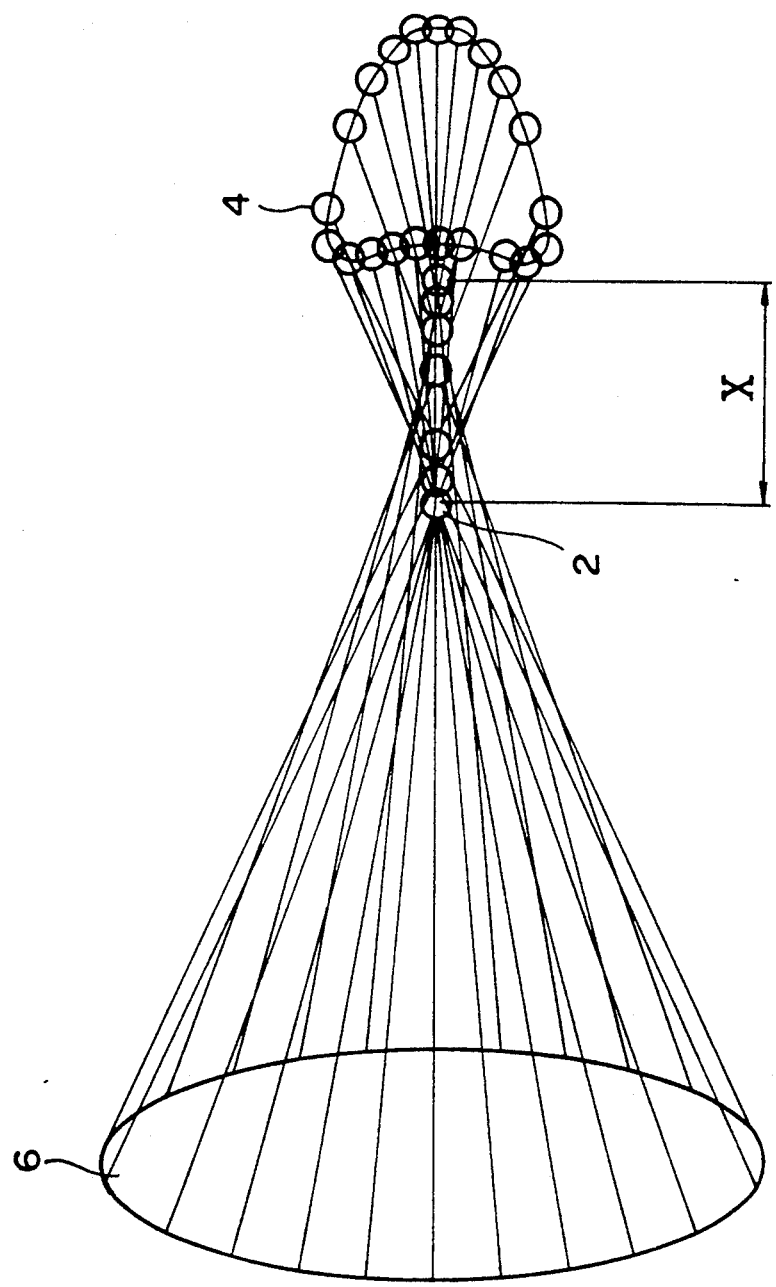
Figure 9:
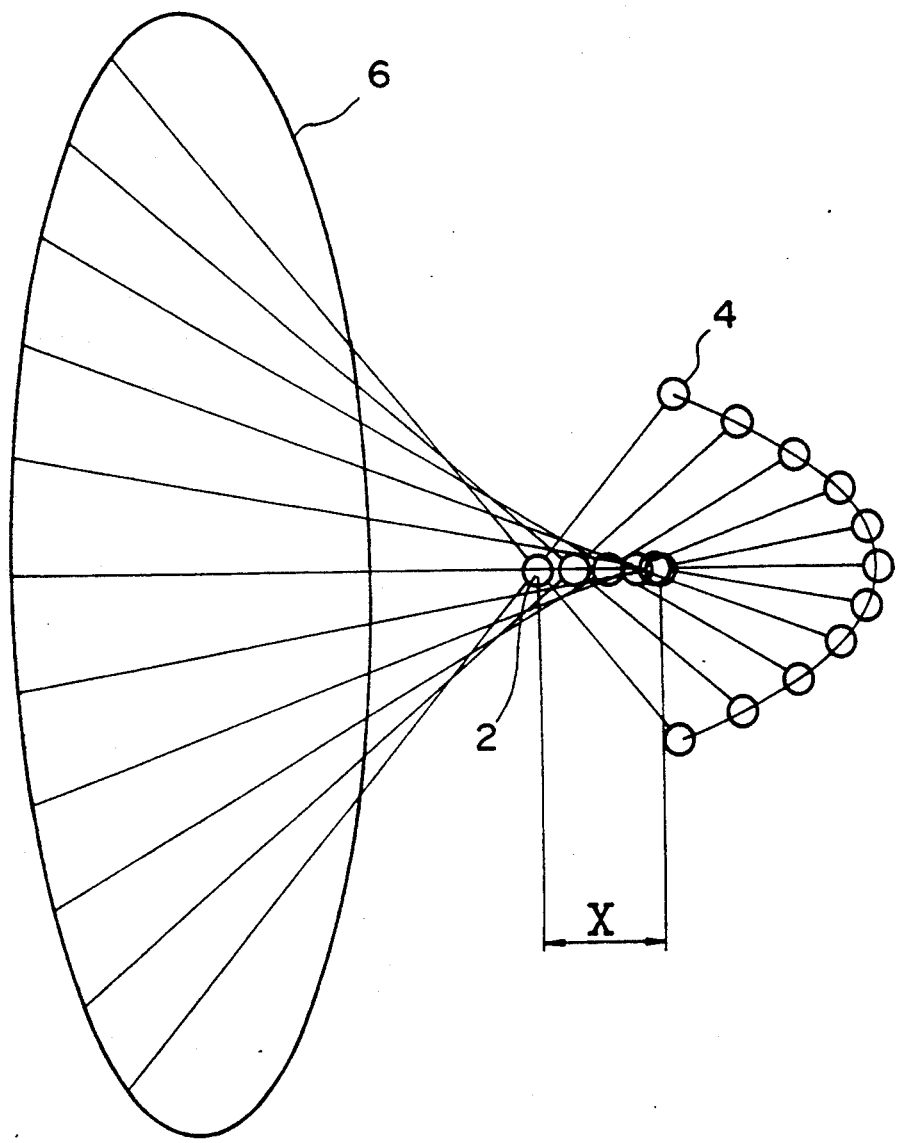

The locus of the action point of the lever apparatus having an internal fulcrum can be linear, as shown in FIG. 7, or elliptical, as shown in FIG. 8 or 9. A movement distance X of the freely movable fulcrum in FIG. 9 is smaller than that in FIG. 8.

Figure 5:
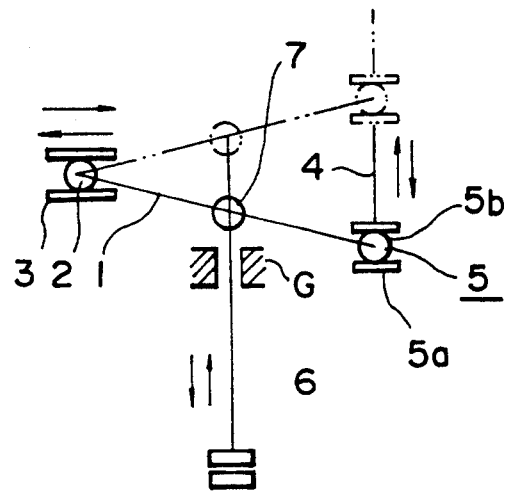

In the embodiment shown in FIG. 5, the fulcrum member 2 and the force point regulator 4 are located at the two ends of the lever member 1, respectively, and the action point regulator 6 is located at the intermediate portion of the lever member 1, thus constituting an external fulcrum configuration. In this case, a stroke on the action point side is smaller than that on the force point side, and a force is increased.

Figure 6:
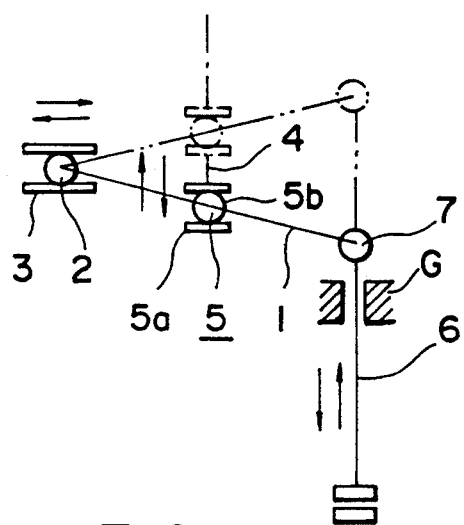

In the embodiment shown in FIG. 6, the fulcrum member 2 and the action point regulator 6 are arranged at the two ends of the lever member 1, and the force point regulator 4 is arranged at the intermediate portion of the lever member 1. In this case, the stroke on the action point side is larger than that on the force point side, and a force is small.

Figure 10:
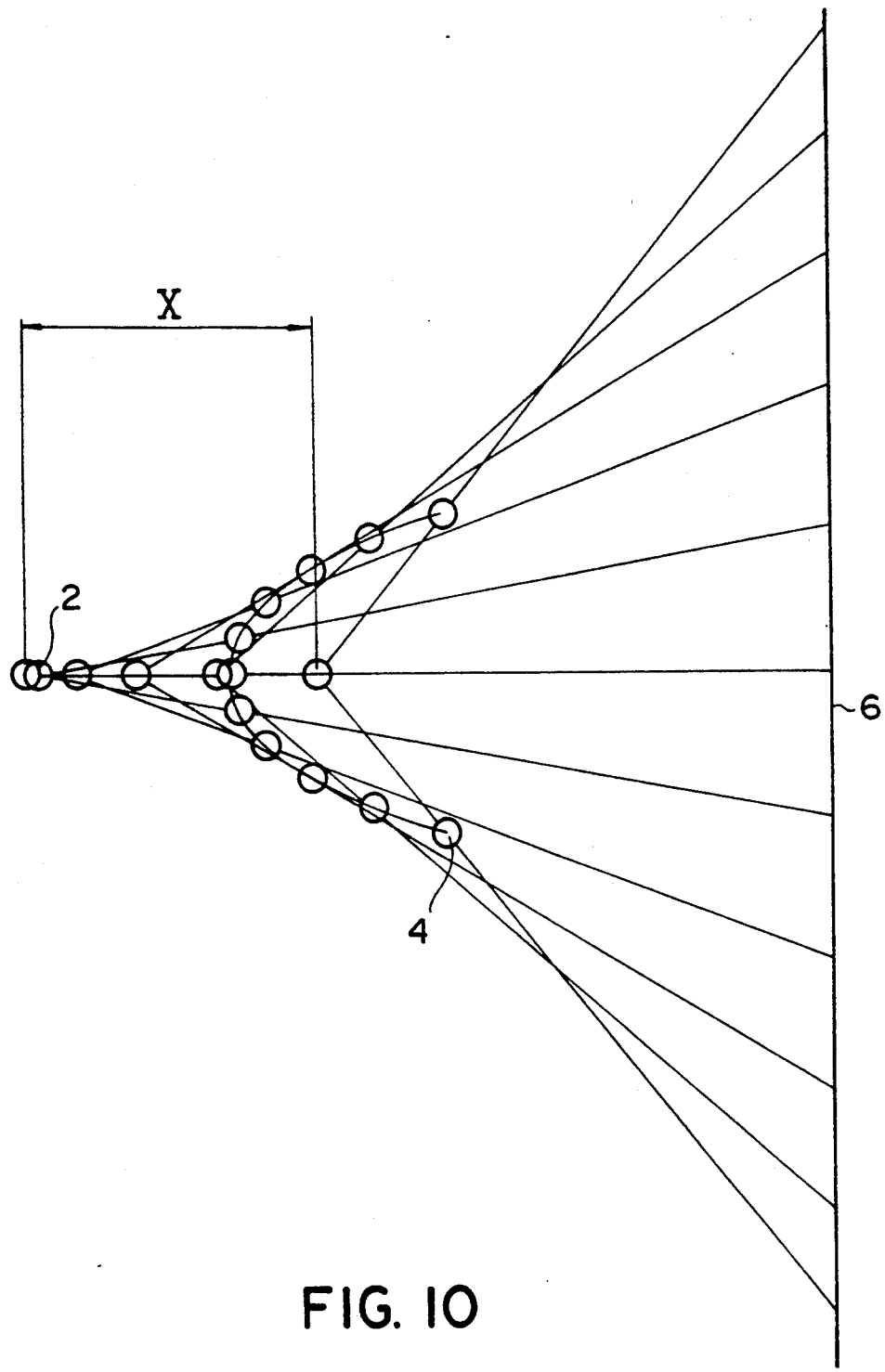
Figure 11:
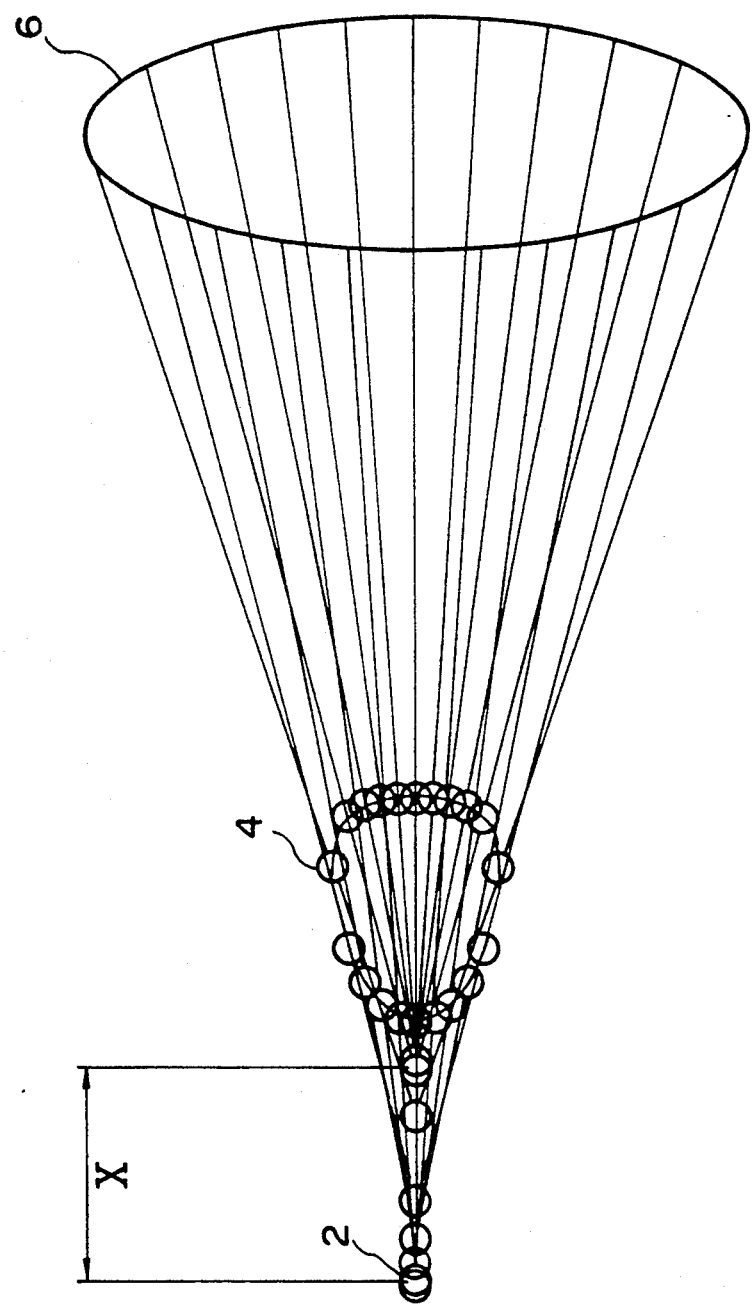
Figure 12:
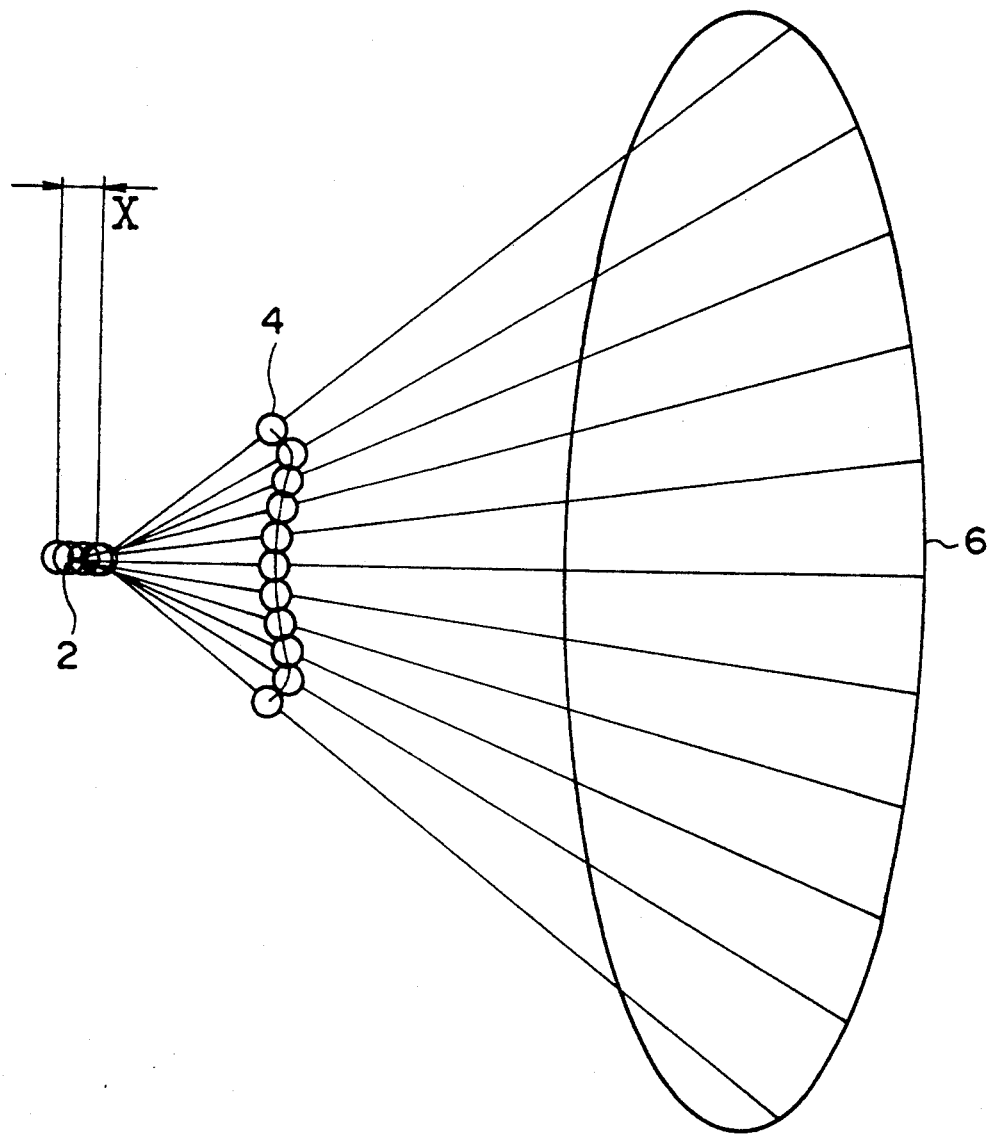

In the embodiment shown in FIG. 6, the locus of the action point regulator 6 is linear, as shown in FIG. 10, the force point regulator 4 has a locus of a parabola, and the fulcrum 2 has a locus of reciprocal motion. A locus of the action point is elliptical in FIGS. 11 and 12.

In each of these embodiments described above, since the fulcrum member 2 is freely moved in accordance with motion of the force point regulator 4 and motion of the action point regulator 6 upon pivotal movement of the lever member 1, degrees of freedom of motion of the force point regulator 4 and that of the action point regulator 6 are large. The connecting member 5 of the force point regulator 4 is moved to an optimal position by a sum of kinetic functions of the action point regulator 6 and the fulcrum member 2. For this reason, while a motion range of the action point regulator 6 is widened, a driving force from the force point regulator 4 can be effectively transmitted to the action point regulator 6 through the lever member 1.

Motion of the fulcrum member 2, motion of the force point regulator 4, and motion of the action point regulator 6 can be any combination of vertical linear motion, horizontal linear motion, oblique linear motion, vertical circular motion, horizontal circular motion, oblique circular motion, and the like, as needed.

The freely movable fulcrum type lever apparatuses having the above arrangements can be widely used in machine tools (e.g., a press apparatus), industrial machines, and movable parts of various other structures.

An embodiment of a press apparatus which employs the lever apparatus of the present invention will be described with reference to FIGS. 13 to 21.

The press apparatus of this embodiment is used to connect a wire and a compression bonding terminal by compression bonding.

Figure 13:
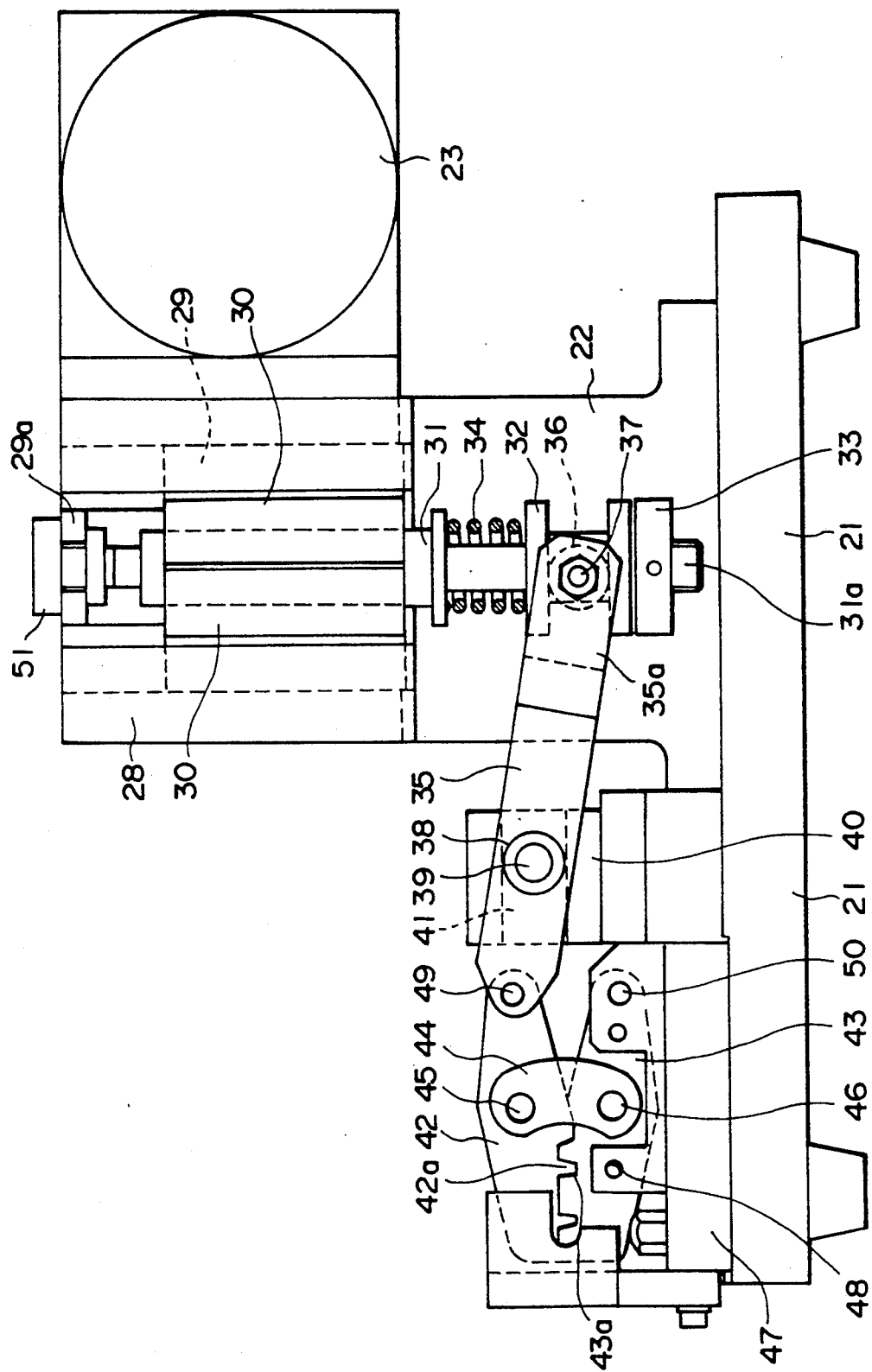
FIGS. 13 to 21 are views showing a press apparatus arranged using the lever apparatus according to the present invention.
Figure 14:
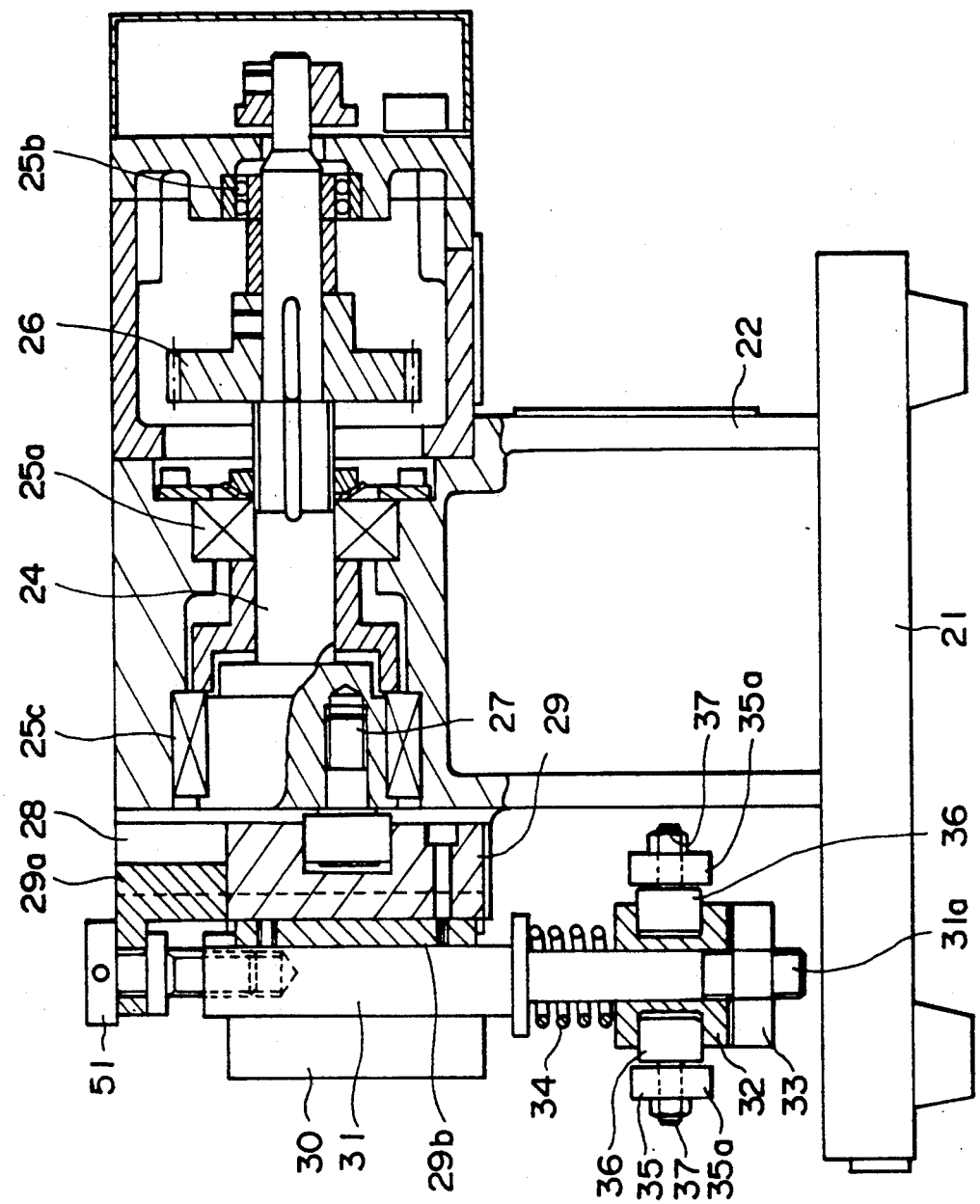

A structure of the press apparatus will be described with reference to FIGS. 13 and 14.

A main body 22 is mounted on a base 21, and an electric motor 23 is arranged in the main body 22. A rotating shaft 24 is supported by a bearing 25a in the main body 22, and a gear 26 is mounted on the rotating shaft 24 to receive a rotational force from the electric motor 23. An eccentric shaft 27 is mounted at one end of the rotating shaft 24 at an eccentric position. A guide member 28 is mounted outside one end of the main body 22 along the vertical direction. The eccentric shaft 27 mounted o the rotating shaft 24 is rotatably inserted in a lift member 29 vertically movably mounted on the guide member 28. A ram 31 is inserted inside a holder 30 arranged in the lift member 29. The ram 31 can be vertically moved along a rail 29b formed on the lift member 29. An adjusting screw 51 mounted in an upper end portion 29a of the lift member 29 is threadably engaged with the upper end portion of the ram 31 to regulate the lower position of the ram 31. A vertically movable cam 32 having a bobbin-like shape is mounted in a lower portion of the ram 31 and is supported upward by a nut 33 threadably engaged with a threaded portion 31a formed at the lower end portion of the ram 31. The ram 31 is urged against the upper side of the cam 32 by a compression coil spring 34. In the driving mechanism having the above arrangement, upon driving of the electric motor 23, the rotating shaft 24 is rotated through the gear 26, and the eccentric shaft 27 is eccentrically rotated about the rotating shaft 24. Upon eccentric rotation of the eccentric shaft 27, the lift member 29 is vertically moved along the guide member 28. The ram 31 and the cam 32 are vertically moved together with the lift member 29. The lift member 29 and the ram 31 function as the force point regulator.

Figure 15:
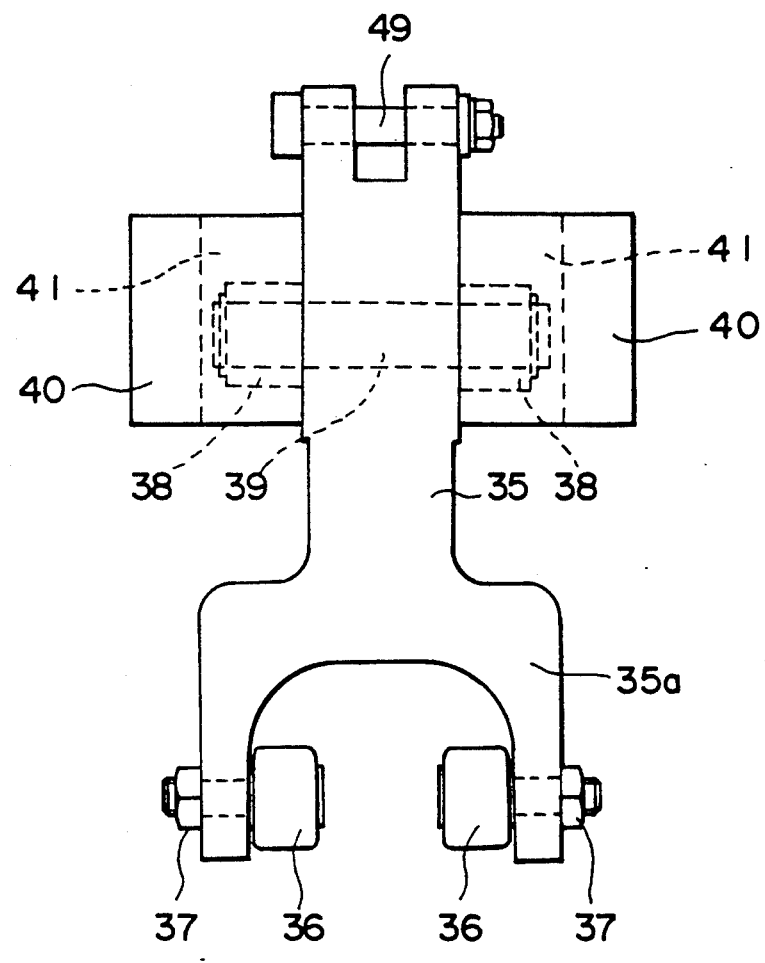
Figure 16:
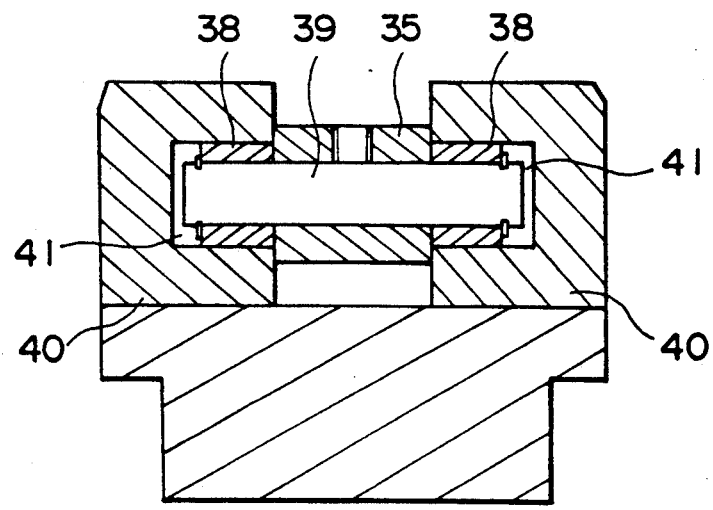

A lever member 35 is disposed at a position near the ram 31 on the base 21 in a direction perpendicular to the rotating shaft 24. As shown in FIGS. 15 and 16, a fulcrum shaft 39 is mounted at an intermediate portion of the lever member 35 in a direction perpendicular to the longitudinal direction of the lever member 35. Fulcrum rollers 38 are rotatably arranged at the two ends of the fulcrum shaft 39. Guide members 40 are mounted on the base 21 at positions respectively corresponding to both sides of the lever member 35. The fulcrum rollers 38 of the lever member 35 are rotatably and movably inserted into guide grooves 41 respectively formed in guide members 40 along the horizontal direction. The lever member 35 is pivoted about the fulcrum shaft 39 in a vertical plane and can be freely moved along the guide groove 41 through the rollers 38. Horizontal shafts 37 are mounted in the arms of a Y-shaped portion 35a formed at a one-end portion of the lever member 35. Rollers 36 are rotatably mounted on the shafts 37, respectively. The Y-shaped portion 35a of the lever member 35 sandwiches both sides of the cam 32 of the ram 31, so that the rollers 36 are rotatably and movably fitted in the cam 32.

Figure 17:
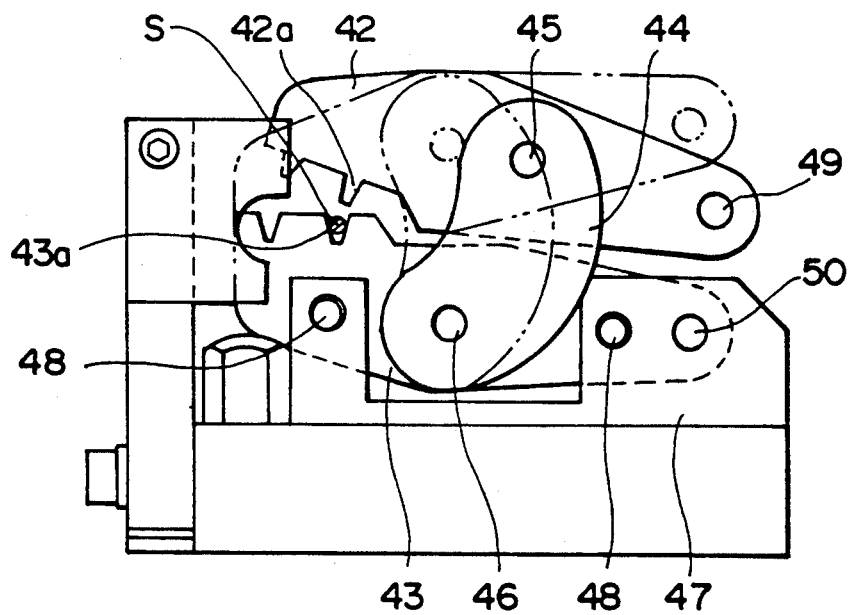
Figure 18:
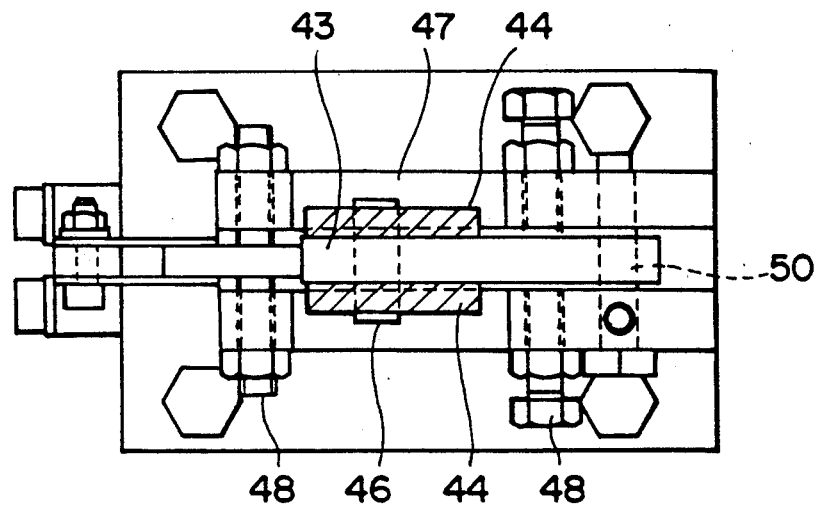

A pair of heads 42 and 43 are disposed at positions near the lever member 35 on the base 21. As shown in FIGS. 17 and 18, the heads 42 and 43 resemble a wrench head. The heads 42 and 43 are pivotally mounted through pivot shafts 45 and 46 to a common connecting member 44 located at the intermediate portions of the heads 42 and 43 and can be opened/closed. The heads 42 and 43 have projections 42a and recesses 43a which are adapted to engage with each other. The heads 42 and 43 are mounted on a head table 47 on the base 21 such that the proximal portions of the heads 42 and 43 are directed toward the lever member 35, one head 43 is horizontally located as a lower head, and the lower head 43 is fixed by bolts 48. The proximal end portion of the upper head 42 is rotatably connected to the other end of the lever member 35 through a connecting shaft 49. Note that the proximal end portion of the lower head 43 is connected to the head table 47 through a connecting shaft 50.

An operation of the press apparatus having the above structure will be described with reference to FIG. 18 to FIG. 21.

Figure 19:
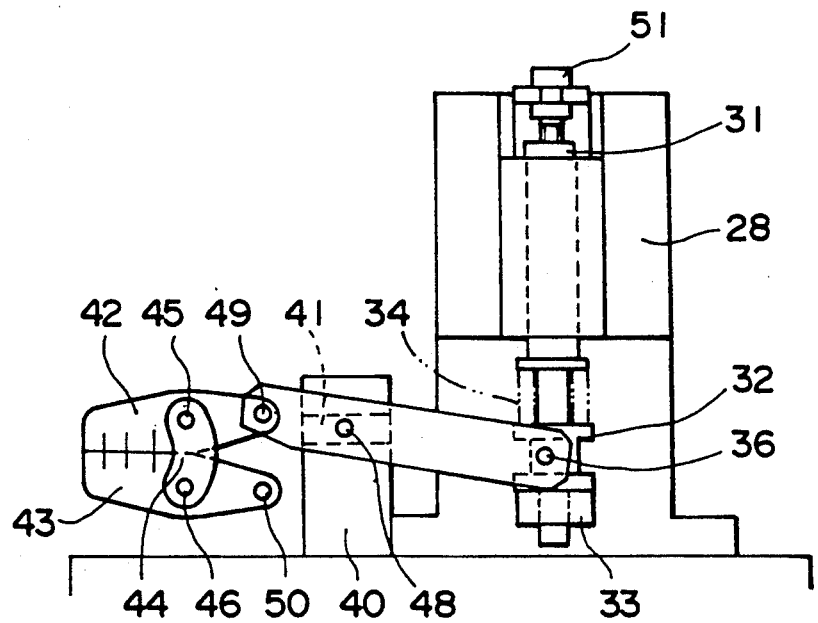
Figure 20:
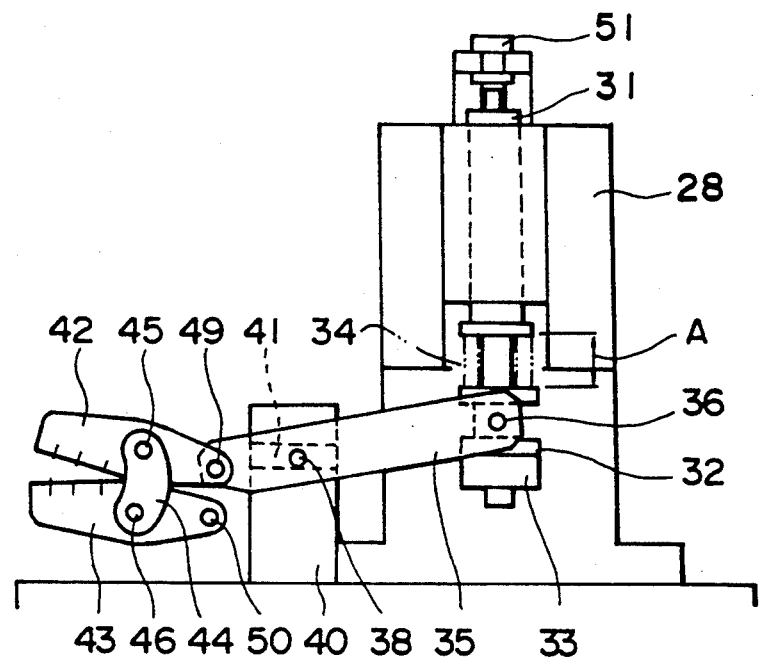
Figure 21:
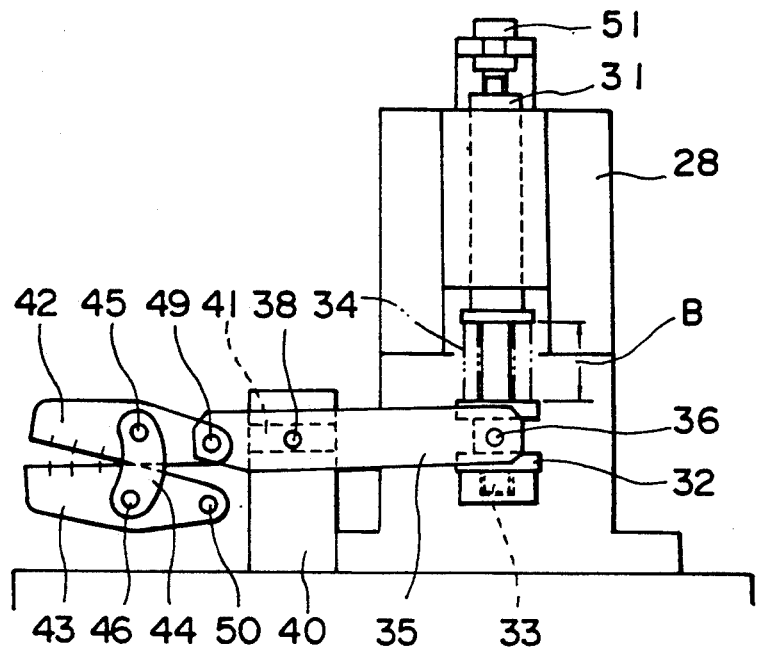

As shown in FIG. 20, FIG. 21, and FIG. 17, the upper head 42 is open to set a wire S and a compression bonding terminal (not shown) in the recess 43a of the lower head 43, as shown in FIG. 17. In this case, the eccentric shaft 27 in the driving mechanism is moved to the top dead point to move the ram 31 upward. As shown in FIG. 19, the rotating shaft 24 is rotated to move the 27 to the bottom dead point to move the ram 31 downward. Upon downward movement of the ram 31, this motion is transmitted to the lever member 35 through the cam 32 and the rollers 36. The lever member 35 is pivoted clockwise about the fulcrum shaft 39. At the same time, the fulcrum roller 38 is moved toward the head along the guide grooves 41 of the guide members 40, and the lever member 35 is thus freely moved accordingly. In this case, by a combination of the cam 32 and the rollers 36, the lever member 35 can be moved relative to the ram 31. Upon pivotal and movable operations of the lever member 35, the upper head 42 is pivoted counterclockwise about the pivot shaft 45. The projection 42a compresses the wire S and the compression bonding terminal (now shown) which are set in the recess 43a of the head 43, thereby compression-bonding the wire S to the compression-bonding terminal. Note that the connecting member 44 is also operated about the pivot shaft 46.

Upon completion of compression bonding, the rotating shaft 24 is rotated to move the eccentric shaft 27 to the top dead point. In this case, the operations are opposite to those described above.

A compression bonding force is adjusted by adjusting the position of the ram 31 by the adjusting screw 51. Degrees of openings between the heads 42 and 43 are adjusted by adjusting the nut 33, as shown in FIGS. 20 and 21, to change the length A or B of a spring 34.

Since the lever member 35 is supported by the fulcrum 39 to perform a combination of pivotal and movable operations, the head 42 can be efficiently operated for compression bonding upon motion of the ram 31. The motion of the lever member 35 can absorb unnecessary motion of each part, i.e., backlash. The motion of the ram 31 can be transmitted to the head 42 without any waste, and a slow operation can be performed. The force of the ram 31 can be effectively transmitted while systematic operations are performed.

In this embodiment, the ram 31 is connected to the lever member 35 by a combination of the cam 32 and the rollers 36. This arrangement has an advantage in that a large mechanical strength can be obtained, in unnecessary motion can be absorbed, and motion transmission can be performed without any loss.

The present invention is not limited to the above embodiments, but can be changed and modified in a variety of applications.

In the freely movable fulcrum type lever apparatus of the present invention, as described above, the lever member is supported by a movable fulcrum, and the range of motion of the force point regulator connected to the lever member and the range of motion of the action point regulator can be largely increased.

In the press apparatus of the present invention, the lever member supported by the fulcrum is used to systematically and properly perform a press operation by causing the heads to perform motion suitable for the press operation.

Figure 22A:
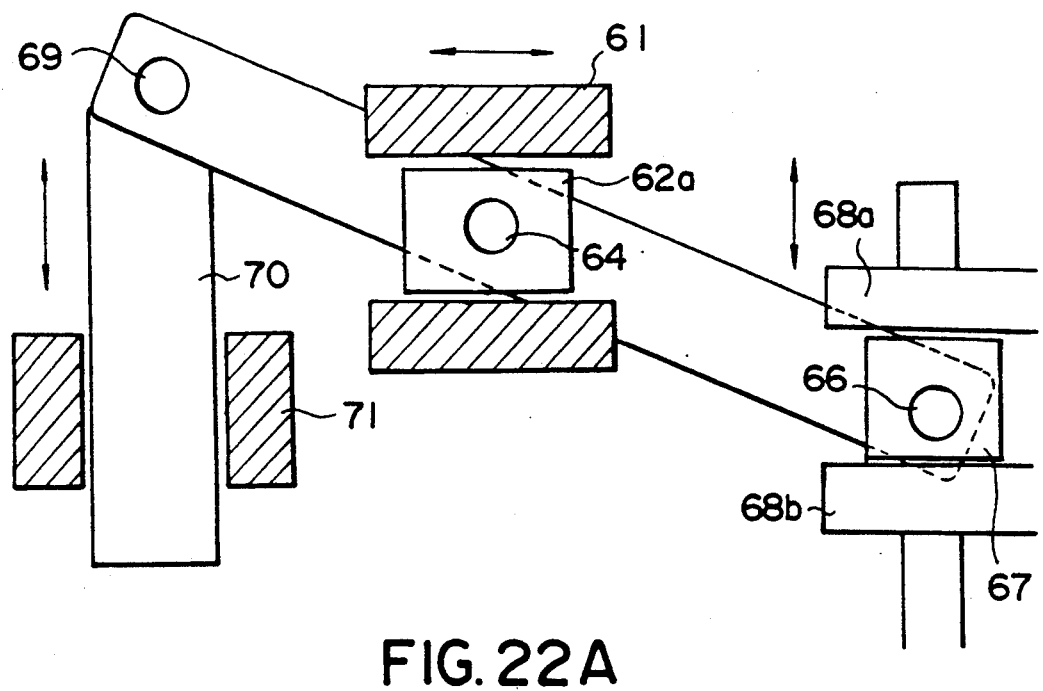
FIGS. 22A and 22B are views showing another example of fulcrums.
Figure 22B:
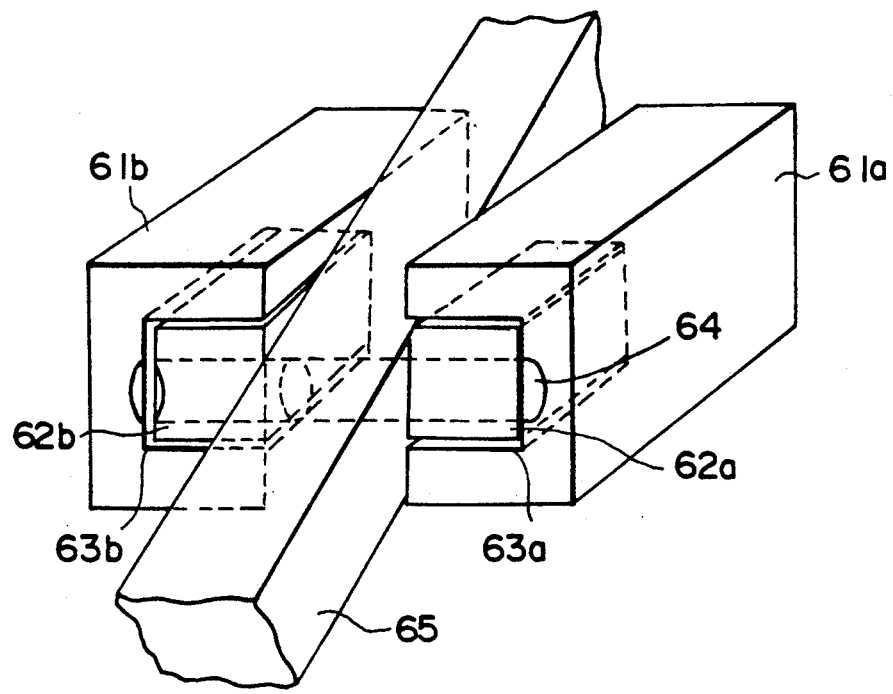

In the lever apparatus used in the press apparatus shown in FIG. 16, the fulcrum rollers 38 mounted on the support shaft 39 are in rolling contact with the guide grooves 41, thereby constituting the freely movable fulcrum. In a structure shown in FIGS. 22A and 22B, without using the fulcrum roller, a lever member 65 is pivotally supported by a fulcrum shaft 64 inserted into holes formed in sliders 62a and 62b inserted into guide grooves 63a and 63b formed in guide members 61a and 61b of a freely movable fulcrum regulator. One end of the lever member 65 is connected to a slider 67 through a shaft 66 inserted into holes of the slider 67 in the same manner as the support point shaft 64. The slider 67 is slidably inserted between guide members 68a and 68b of a force point regulator. The other end of the lever member 65 is connected to an action point member 70 through a shaft 69. The action point member 70 is inserted into a guide member 71 of the action point regulator fixed on the ground and is regulated to perform linear motion. In this case, the outer surfaces of the sliders 62a, 62b, and 67 are finished with high precision, and the inner surfaces of the guide grooves 63a, 63b, 68a, and 68b are smoothed to reduce frictional forces, thus posing little practical problems. In particular, as shown in FIG. 23A, since a force transmitted to the shaft 66 is always transmitted perpendicularly, no torsion stress in the conventional arrangement shown in FIG. 1A is generated.

Figure 23A:
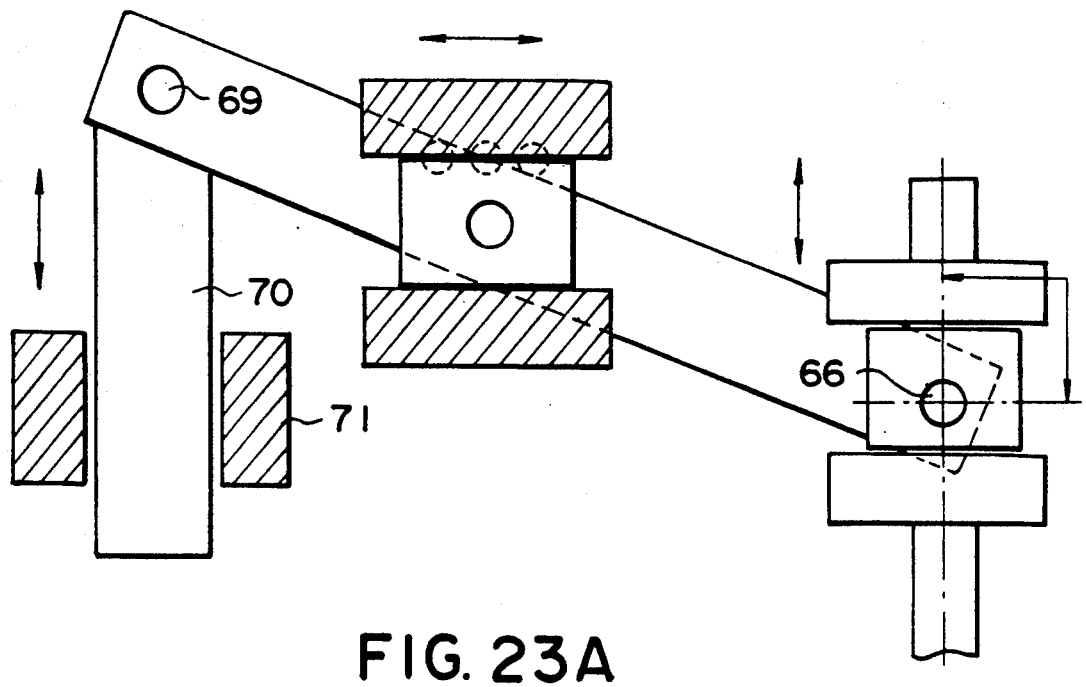
FIGS. 23A and 23B are views showing still another example of fulcrums.
Figure 23B:
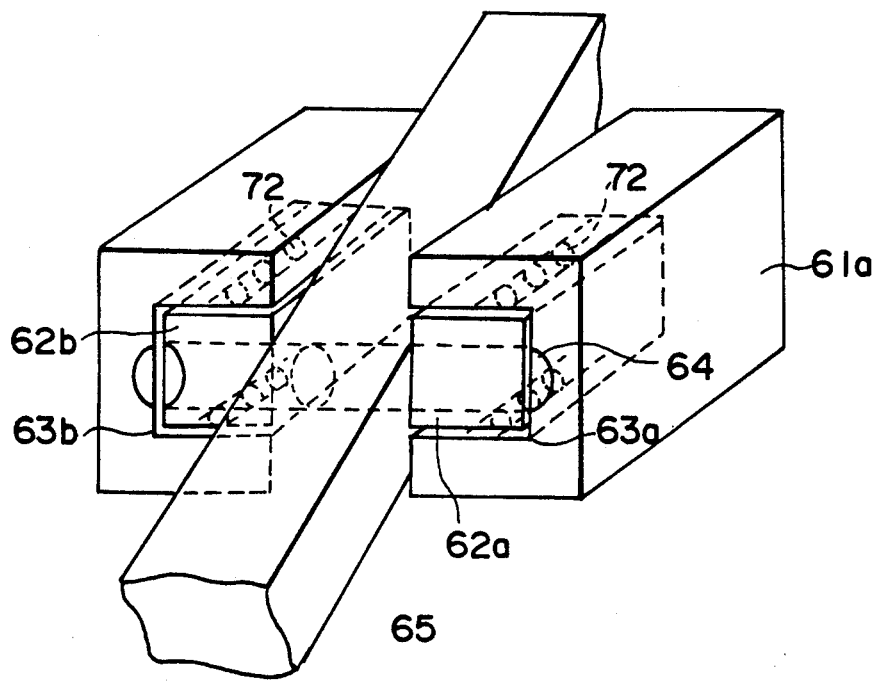

However, in order to smooth movements of the sliders 62a, 62b, and 67, a plurality of ball bearings 72 can be inserted between the guide grooves 63a and 63b and the sliders 62a and 62b, as shown in FIGS. 23A and 23B. Note that rollers may be used in place of ball bearings.

Figure 24:
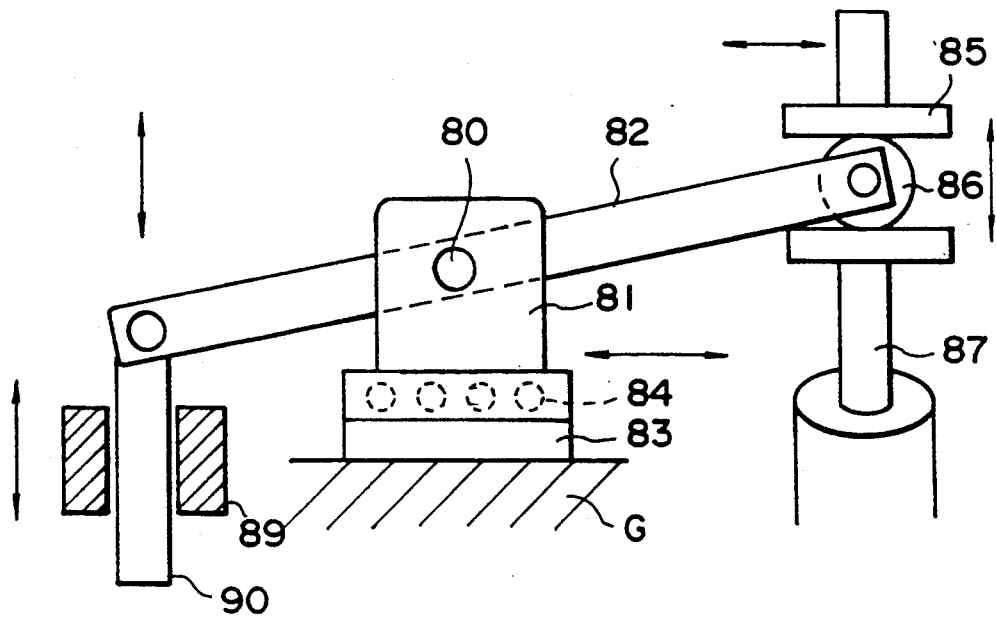
FIGS. 24 and 25 are views showing still another fulcrums.
Figure 25:
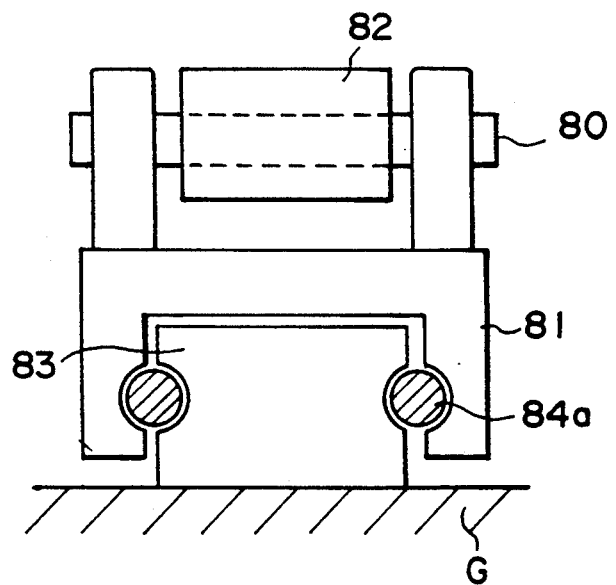

FIGS. 24 and 25 show other embodiments of freely movable fulcrum structures. In the embodiment of FIG. 24, a fulcrum shaft 80 is mounted on a support member 81, and a lever member 82 is pivotally supported on this fulcrum shaft 80. The support member 81 is fitted in a bearing groove formed on a bed 83 fixed on the ground G. The support member 81 is movable through ball bearings 84 inserted between the support member 81 and the bearing groove in a direction indicated by an arrow. One end of the lever member 82 is connected to a driving shaft 87 through a cam follower type connecting member having a roller 86 inserted between guide plates 85 of the force point regulator. The other end of the lever member 82 is connected to a link rod 90 supported on an action point regulator 89 through a shaft 88. In the movable fulcrum formed as described above, fulcrum shaft 80 is not moved but the support member 81 is freely moved on the bearings 84.

In the embodiment of FIG. 25, a lever member 82 pivotally supported on a fulcrum shaft 80 is movably supported in a direction of straight rails 84a on a support member 81 placed on a bed 83 fixed on the ground G through the rails 84a, thereby constituting a freely movable fulcrum.

Figure 26:
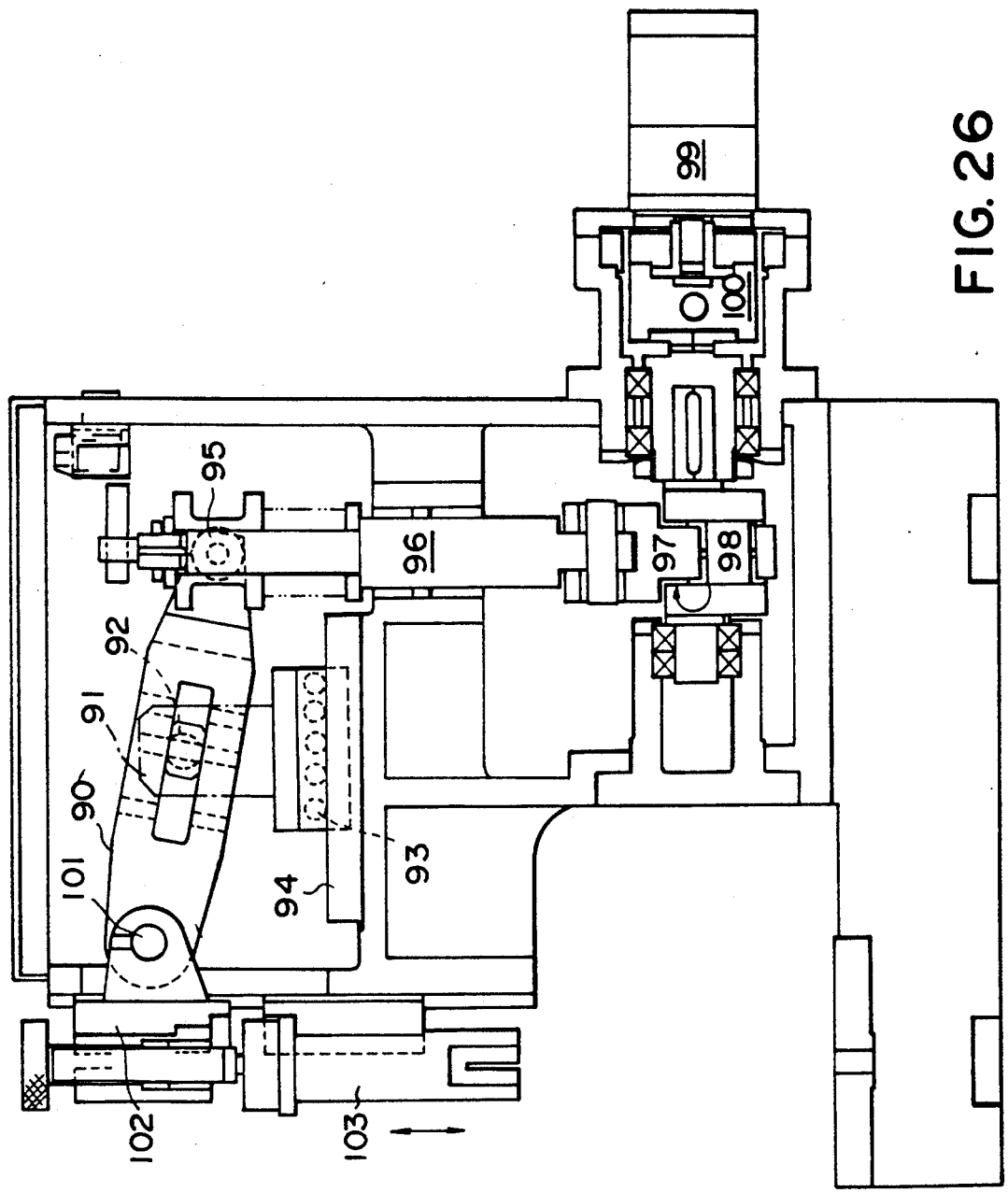
FIG. 26 is a view showing a press apparatus arranged using the fulcrum shown in FIG. 24.

FIG. 26 shows a press apparatus having a lever apparatus having the fulcrum with the structure shown in FIG. 24. This press apparatus has substantially the same arrangement as that of the press apparatus shown in FIGS. 13 and 14, but is different therefrom in an arrangement of a movable fulcrum of the lever apparatus. In the press apparatus shown in FIG. 13, the lever member 35 is pivotally supported by the fulcrum shaft 39 on the rollers 38 which are in rolling contact with the fulcrum grooves 41 formed in the fulcrum member 40. In the press apparatus of FIG. 26, however, the structure of the fulcrum of the lever apparatus is identical to that shown in FIG. 24. A lever member 90 is pivotally supported by a fulcrum shaft 92 on a support member 91. The support member 91 is freely movable held on a main body 94 through ball bearings 93.

One end of the lever member 90 is connected to a vertical driving shaft 96 through a cam follower structure 95 serving as a force point. The lower end of the vertical driving shaft 96 is connected to an eccentric shaft 98 through a crank mechanism 97. Upon rotation of the eccentric shaft 98, the vertical driving shaft 96 is vertically moved. One end of the eccentric shaft 98 is connected to an electric motor 99 through a power transmission mechanism 100 such as a gear unit and is driven and rotated.

The other end of the lever member 90 is connected to a lift member 102 through a shaft 101 serving as an action point, and a head 103 mounted on the lift member 102 is vertically driven, as shown in FIG. 26. In this embodiment, a rotational force of the electric motor 99 is transmitted to the lever apparatus through each link mechanism. A flywheel and the like need not be used, unlike in the conventional apparatus. The apparatus can be made compact, and at the same time, a mechanical power can be smoothly transmitted to the head 103 through the lever apparatus having the freely movable fulcrum.

Figure 27:
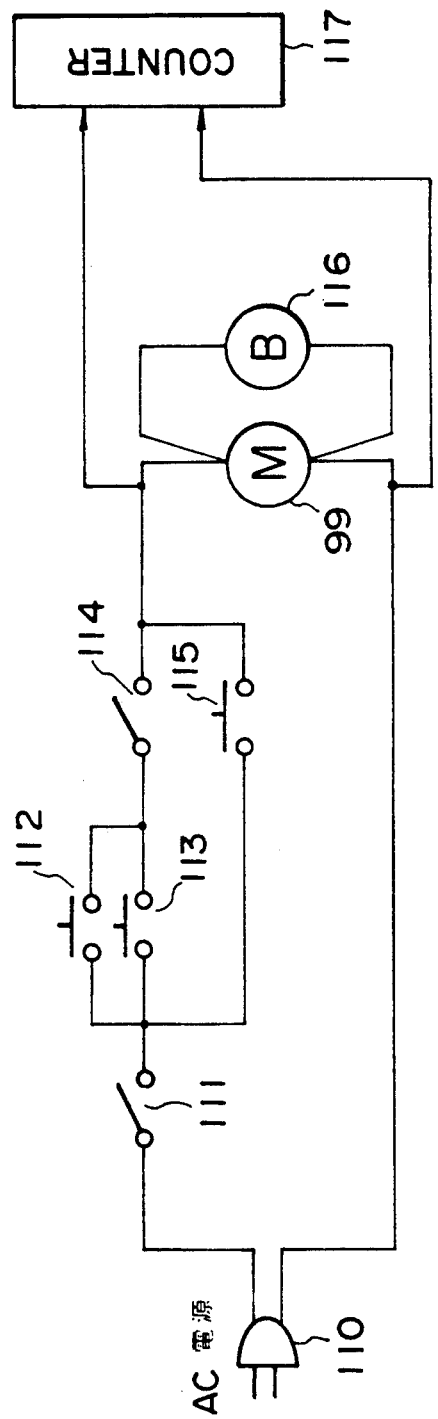
FIG. 27 is a circuit diagram showing an electrical system of the press apparatus shown in FIG. 26.

FIG. 27 is a circuit diagram for driving and controlling the press apparatus shown in FIG. 26. Referring to FIG. 27, one terminal of an AC power source 110 is connected to one terminal of a parallel circuit of a timing switch 112 and a foot switch 113 through a power switch 111. The other terminal of this parallel circuit is connected to one terminal of a motor 99 through a slight movement setting switch 114. The power switch 111 is connected to one terminal of the motor 99 through a slight movement switch 115. The motor 99 is connected in parallel with a brake 116. The timing switch 112 is used to stop the head 103 at an upper position after the head 103 is moved downward and is then moved upward upon completion of a predetermined work. The timing switch 112 is, e.g., a limit switch mounted at the upper limit position of the lift member 102. The switch 112 is kept off only at this upper limit position. The slight movement setting switch 114 is normally ON. The slight movement setting switch 114 is turned off to slightly move the head 103. As a result, the motor 99 can be freely driven to slightly move the head regardless of the ON/OFF states of the switches 112 and 113. A counter 117 is arranged to count the number of driving cycles of the motor 99, i.e., the number of press operation cycles of the head 103, as needed.

Figure 28:
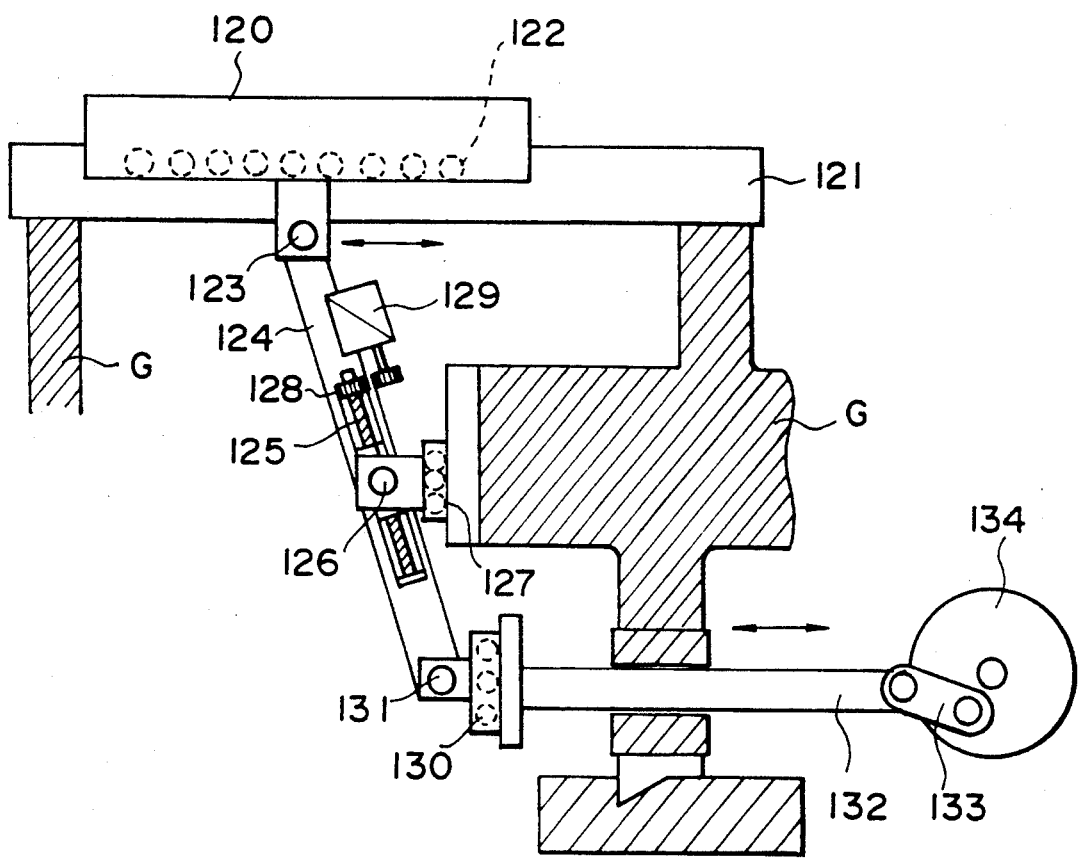
FIG. 28 is a view showing a surface grinder arranged using the lever apparatus of the present invention.

FIG. 28 shows an application in which the present invention is applied to a surface grinder having a stroke adjustable fulcrum point as a movable fulcrum.

Referring to FIG. 28, a head 120 is supported through bearings 122 so that the head 120 can be smoothly moved along a support member 121 on the horizontal plane. A lower portion of the head 120 is axially supported at one end of a lever member 124 by a shaft 123 serving as an action point. The lever member 124 is connected to a fulcrum member 126 engaged with a screw rod 125. The fulcrum member 126 is movably and pivotally mounted on the ground G through a linear bearing mechanism 127. The screw rod 125 is connected to a rotating shaft of a motor 129 mounted on the lever member 124 through a gear unit 128.

The other end of the lever member 124 is connected to a linear bearing mechanism 130 through a shaft 131 serving as a force point. The linear bearing mechanism 130 is connected to a servo motor 134 through a crank shaft 132 and a crank mechanism 133.

In the above arrangement, a rotational force of the servo motor 134 is converted into a linear motion through the mechanisms 132 and 133, and the linear motion is transmitted to the shaft 131 serving as a force point of the lever member 124. Therefore, the lever member 124 is supported by the fulcrum member 126 and linear bearing mechanism 127 and is pivoted so that the bed 120 can be smoothly moved in the horizontal direction.

In this case, when the motor 129 is driven, the screw rod 125 is rotated through the gear unit 128, and the fulcrum shaft 126 is freely moved on the bearing 127 to change a distance between the shafts 123 and 131, thereby changing a stroke of the bed 120.

Figure 29:
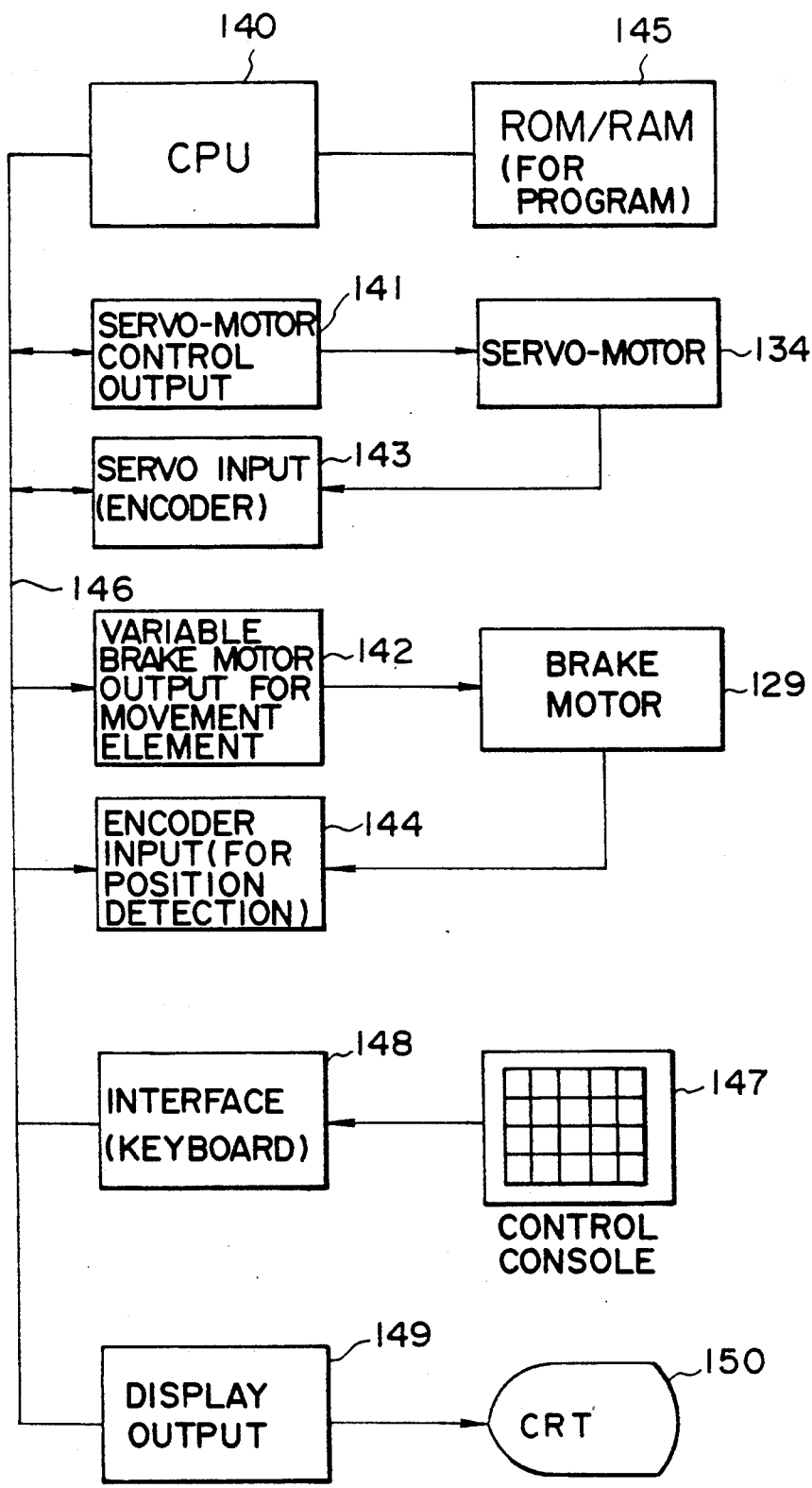
FIG. 29 is a block diagram of a control system of the surface grinder shown in FIG. 28.

FIG. 29 is a block diagram of an electrical control system of surface grinder shown in FIG. 28. Referring to FIG. 29, the servo motor 134 and the brake motor 129 are driven by outputs from a servo motor control output circuit 141 and a movable fulcrum point variable brake motor output circuit 142 which are controlled by a CPU 140. A speed of the servo motor 134 is detected by a servo input encoder 143, and a detection signal is input to the CPU 140. A rotation state of the brake motor 129 is detected by an encoder 144, and a detection signal is input to the CPU 140.

The CPU 140 is connected to a ROM/RAM 145, programs of the entire system are stored, and input data are also stored. An output from a control console through a keyboard interface 148 is output to the CPU 140 through a bus line 146. Various types of data stored in the RAM 145 are supplied from the CPU 140 to a CRT 150 through a display output interface 149 and are displayed on the CRT 150.

Figure 30:
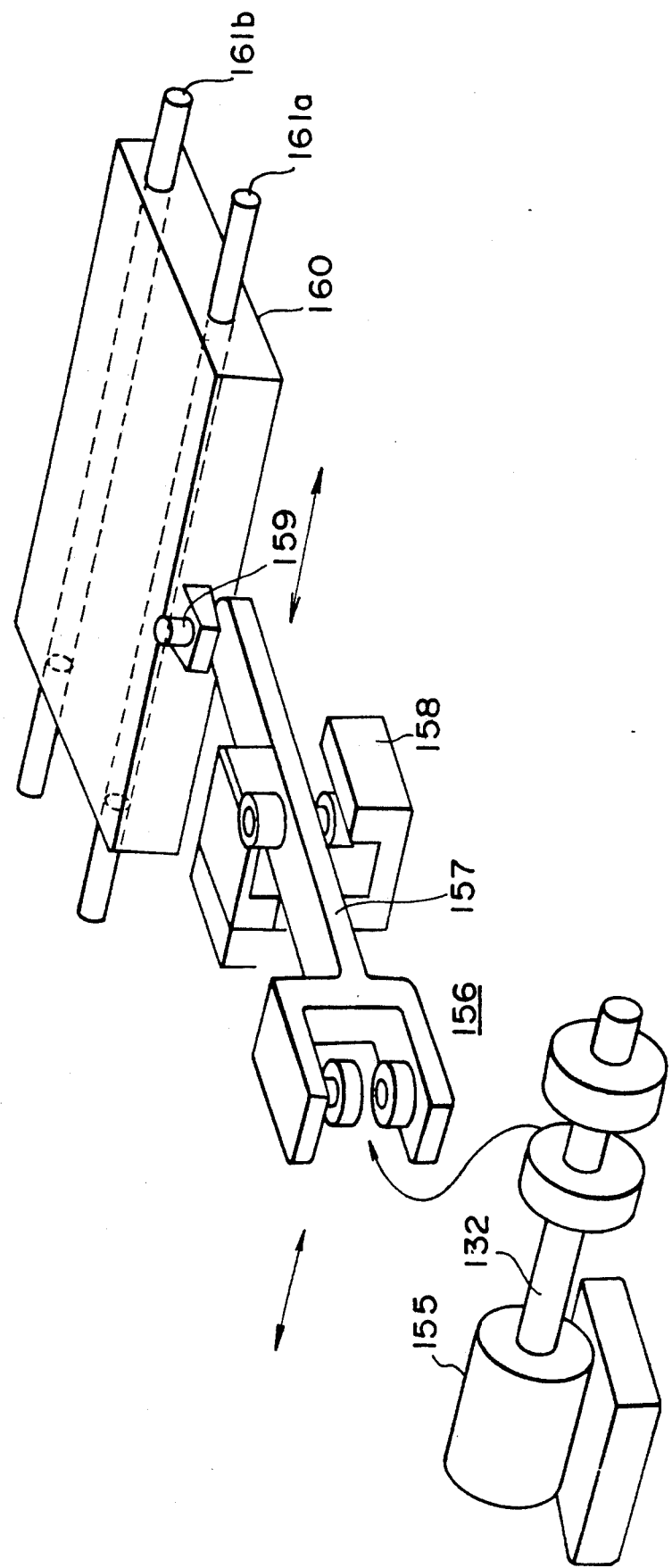
FIG. 30 a view showing an application example of the lever apparatus used in a building damping apparatus.

FIG. 30 shows an embodiment in which the lever apparatus of the present invention is applied to a building damping apparatus. A crank shaft 132 identical to that of FIG. 28 is connected to a crank mechanism and a servo motor (neither are shown) through a shaft support member 155. One end, i.e., a force point side, of a lever member 157 is connected to one end of the crank shaft 132 through a cam follower mechanism 156. A fulcrum 158 of the cam follower mechanism is formed at the central portion of the lever member 157. The other end serving as an action point is connected to a damping block 160 through a pin 159. The damping block 160 is movably held on straight rails 161a and 161b. The straight rails 161a and 161b are fixed at positions having a maximum magnitude at the time of earthquake occurrence, e.g., on a middle floor of a skyscraper.

Figure 31:
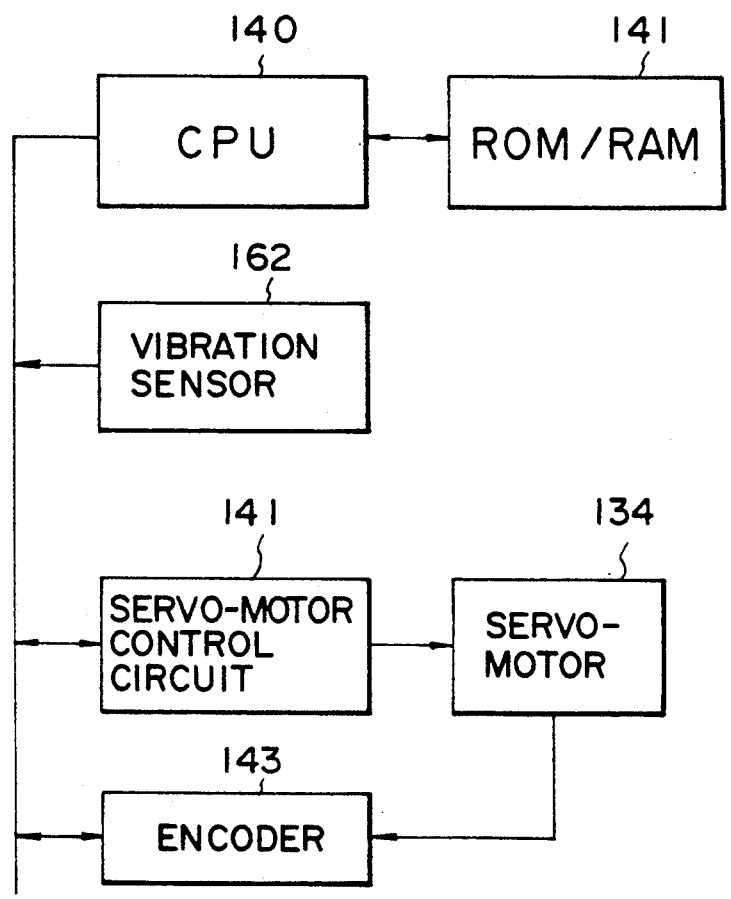
FIG. 31 is a block diagram of a control system of the building damping apparatus shown in FIG. 30.

An operation of the damping apparatus will be described with reference to FIG. 31. When an earthquake occurs to vibrate a building, vibrations are detected by a vibration sensor 162, and magnitude and direction data of the vibrations are supplied to the CPU 140. The CPU 140 sends a driving signal to a servo motor 134 through a servo motor control circuit 141 in the same manner as in FIG. 28 to drive a damping block 160 to move in an opposite direction with an identical magnitude to cancel the vibration of the building. A movement amount of the damping block 166 is detected by an encoder 143 as rotational amount and direction of the servo motor 134.

Earthquake vibrations generally occur several cycles per second. It is easy to move the damping block 160 at this speed. In a conventional damping apparatus, the damping block 160 is moved by using a feed screw, and the response speed is low. In addition, since the block 160 is extremely heavy, the mechanical strength of the feed screw is not sufficient. As a result, a sufficient damping effect cannot be obtained. However, as in this embodiment, a good result can be obtained by a combination of the lever apparatus having a freely movable fulcrum and the straight rails 161a and 161b.

Figure 32:
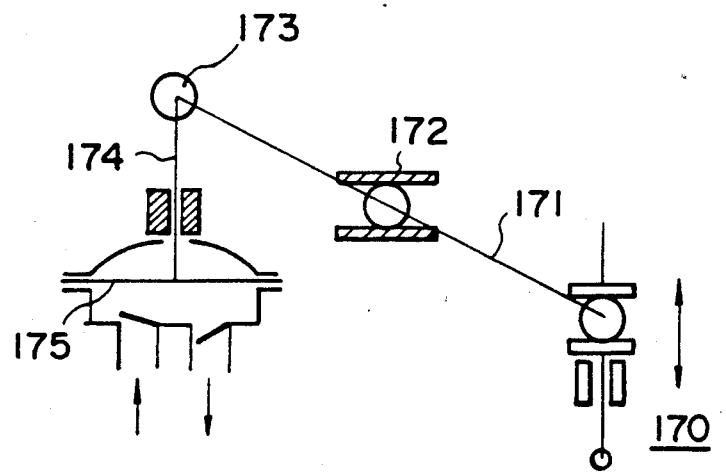
FIG. 32 is a schematic view showing an application wherein the lever apparatus of the present invention is used as a diaphragm pump.

FIG. 32 shows an application in which the lever apparatus of the present invention is used in a driving mechanism for a diaphragm pump. A lever member 171 which receives a pivotal force from a cam follower type force point regulator 170 in a direction of an arrow is pivoted about a fulcrum 172. A diaphragm 175 of the diaphragm pump is vertically driven through an action point regulator 174 connected to an action point 173.

Figure 33:
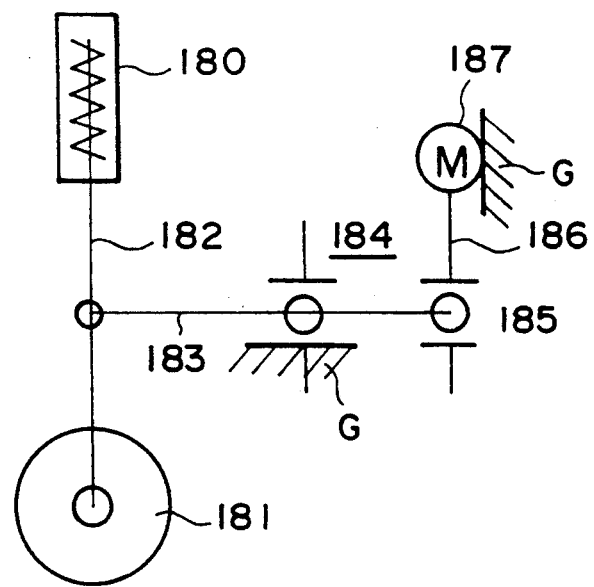
FIG. 33 is a schematic view showing an application wherein the lever apparatus of the present invention is used in an automobile shock absorber.

FIG. 33 shows an application in which the lever apparatus of the present invention is applied to an automobile shock absorber. Referring to FIG. 33, an action point of a lever member 183 is pivotally supported by a link 182 for connecting an automobile shock absorber 180 and an automobile wheel 181. The lever member 183 is connected to a force point regulator 185 through a freely movable fulcrum 184. The force point regulator 185 is connected to a servo motor 187 through a crank shaft 186 in the same manner as in the damping apparatus shown in FIG. 30. The fulcrum 184 and the servo motor 187 are fixed on an automobile body G.

The principle of the automobile shock absorber is substantially the same as that of damping for a building. Motor driving with the arrangement shown in FIG. 31 is performed to effectively absorb automobile vibrations.

Figure 34:
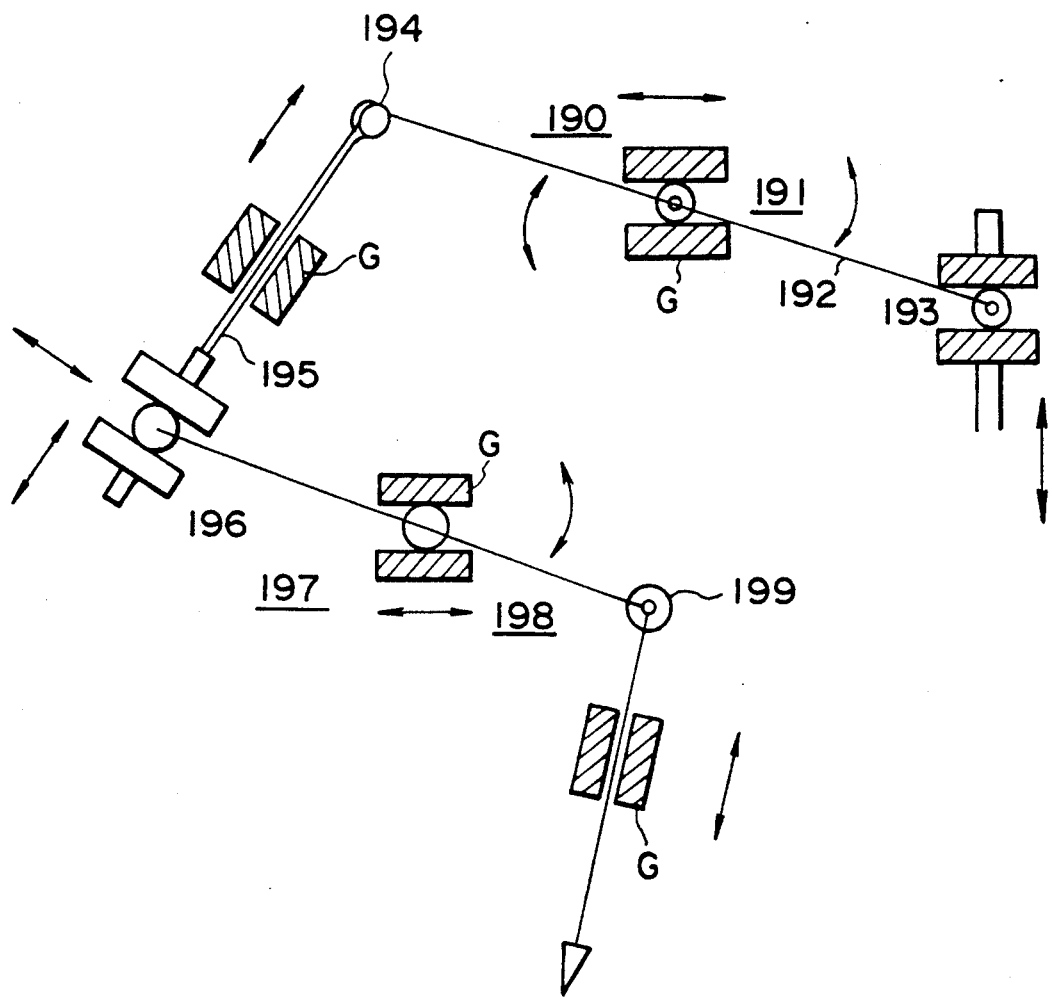
FIG. 34 a view showing a force transmission chain system arranged by connecting the lever apparatus of the present invention to it.

In each of the embodiments described above, only one lever apparatus of the present invention is used. However, two or more lever apparatuses may be combined to constitute a force transmission system, as shown in FIG. 34. A first lever apparatus 190 has a lever member 192 supported by a fulcrum 191, and a force acting on a first force point 193 is transmitted from a first action point 194 to a second force point regulator 196 through a link 195. The force transmitted to the second force point regulator 196 is transmitted to a second action point regulator 199 through a fulcrum 198 of a second lever apparatus 197. All support portions indicated by G are represented by the ground.

Two or more fulcrums are used to constitute a chain system of the lever apparatuses to freely set a force transmission direction.

Figure 35:
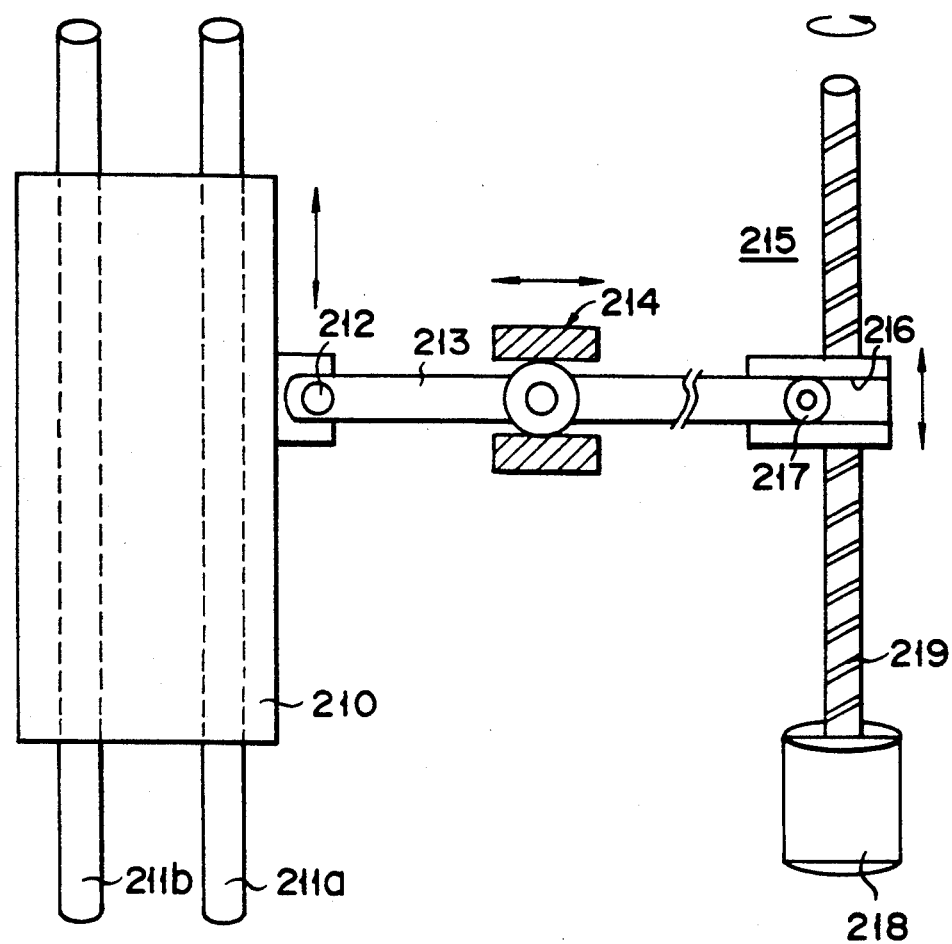
FIG. 35 is a view showing an embodiment wherein the lever apparatus the present invention is used in a drive mechanism for an X-Y table.

FIG. 35 shows an application of an X, Y table using the pivot lever apparatus of the present invention. In this arrangement, a table 210 can be moved along rails 211a and 211b along the X direction. The arrangement and operation in the Y direction can be made in the same manner as in the X direction, and are omitted. The table 210 is axially supported at one end of a lever member 213 through a shaft operated as an action point. A roller 217 in a driving guide member 216 serving as a force point of a ball screw rotation feed mechanism 215 is mounted at the other end of the lever member 213 through a fulcrum 214. The guide member 216 is threadably engaged with a ball screw 219 driven by a motor 218.

Figure 36:
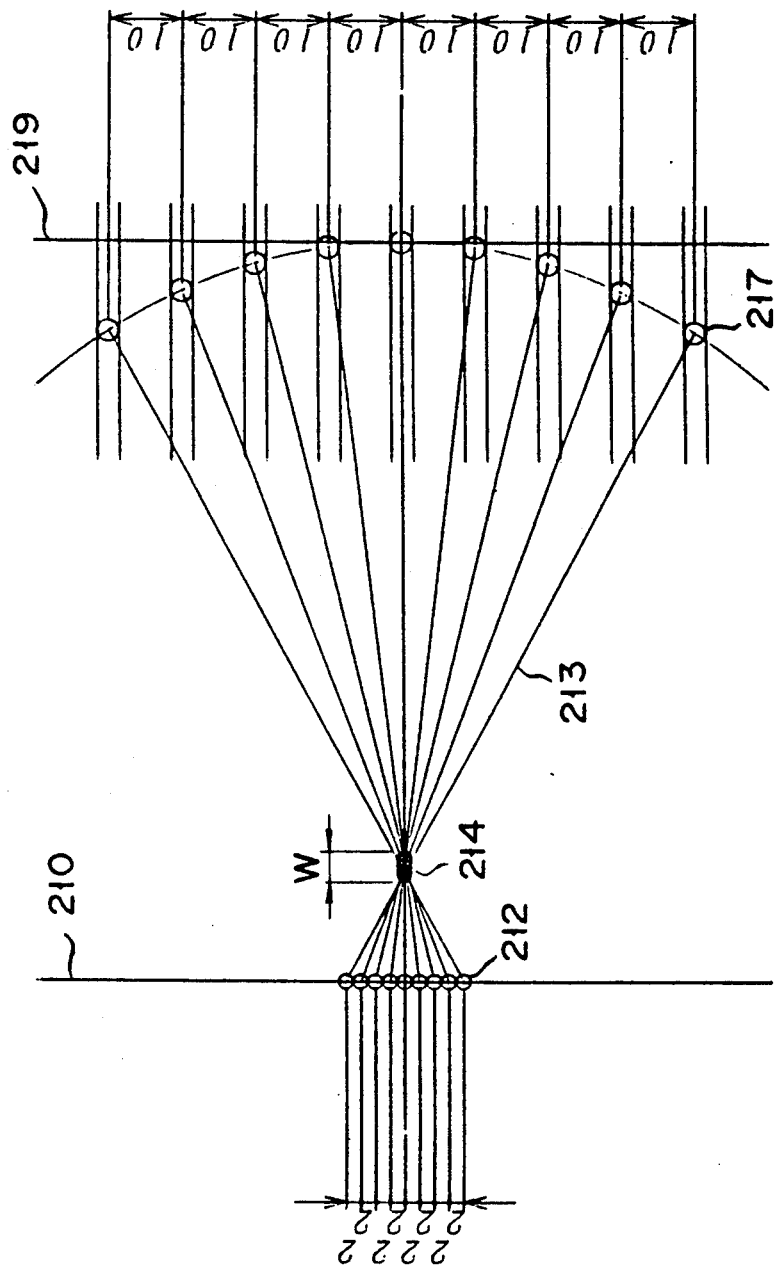
FIG. 36 is a view showing an operation locus of the main part in FIG. 35.

FIG. 36 shows a motion locus of each portion in FIG. 35. When the ball screw 219 is fed, e.g., every 10 $\mu$m, an action point 212, i.e., the table 210, is moved every 2 $\mu$m. The roller 217 serving as a force point is moved within the guide member 216 and has an arcuated locus. The fulcrum 214 is freely moved by w in response to feeding of the ball screw 219 by 80 $\mu$m. The action point 212 is moved by 16 $\mu$m (=80/5).

When the X, Y table is arranged as described above, the table 210 is driven with very high precision. The X, Y table can be used in a semiconductor wafer exposure apparatus.

We claim:

1. A movable fulcrum type lever apparatus comprising:
   a lever member having a force point, a fulcrum point and an action point;
   fulcrum means for pivotally supporting said lever member at said fulcrum point such that said lever member is swingable about said fulcrum point;
   fulcrum guide groove means including a guide groove extending linearly in a longitudinal direction of said lever member for guiding said fulcrum means movably in the longitudinal direction crossing a swinging direction of said lever member along said guide groove;
   a force point regulator connected to said force point of said lever member for applying a swinging force to said lever member crossing the longitudinal direction of said lever member; and
   an action point regulator connected to said action point of said lever member for applying an action force to an action receiving member;
   wherein said force point regulator includes a regulator slider pivotally mounted at said force point of said lever member and a pair of regulator guide plates between which said regulator slider is in sliding contact, whereby said force point moves along said guide plates to draw a curved locus, said fulcrum point moves linearly in the longitudinal direction of said fulcrum guide groove, and said action point has a linear locus, when said lever member swings about said fulcrum point thereof.

2. A movable fulcrum type lever apparatus according to claim 1, wherein:
   said fulcrum means includes a fulcrum shaft for pivotally supporting said lever member at said fulcrum point, and a fulcrum roller receiving said fulcrum shaft acting as a rotating shaft of said fulcrum roller; and
   said fulcrum roller is inserted in said fulcrum guide groove means such that said fulcrum roller moves freely in the longitudinal direction of said lever member along said guide groove.

3. A movable fulcrum type lever apparatus according to claim 1, wherein:
   said fulcrum means includes a fulcrum slider inserted in said fulcrum guide groove means in a freely movable manner in the longitudinal direction of said lever member along said guide groove; and
   said fulcrum slider has a hole therein and wherein a fulcrum shaft is inserted in said hole for pivotally supporting said lever member at said fulcrum point.

4. A movable fulcrum type lever apparatus comprising:
   a lever member having a force point, a fulcrum point and an action point;
   fulcrum means for pivotally supporting said lever member at said fulcrum point such that said lever member is swingable about said fulcrum point;
   fulcrum guide groove means including a guide groove extending linearly in a longitudinal direction of said lever member for guiding said fulcrum means movably in the longitudinal direction crossing a swinging direction of said lever member along said guide groove;
   a force point regulator connected to said force point of said lever member for applying a swinging force to said lever member crossing the longitudinal direction of said lever member; and
   an action point regulator connected to said action point of said lever member for applying an action force to an action receiving member;
   wherein said force point regulator includes a regulator roller rotatably mounted at said force point of said lever member and a pair of guide plates between which said regulator roller is in rolling contact, whereby said force point moves along said guide plates to draw a curved locus, said fulcrum point moves linearly in the longitudinal direction of said guide groove, and said action point has a linear locus, when said lever member swings about said fulcrum point thereof.

5. A movable fulcrum type lever apparatus according to claim 4, wherein:
   said fulcrum means includes a fulcrum shaft for pivotally supporting said lever member at said fulcrum point, and a roller receiving said fulcrum shaft acting as a rotating shaft of said roller; and
   said roller is inserted in said fulcrum guide groove means such that said roller moves freely in the longitudinal direction of said lever member along said guide groove.

6. A movable fulcrum type lever apparatus according to claim 4, wherein:
   said fulcrum means includes a slider inserted in said fulcrum guide groove means in a freely movable manner in the longitudinal direction of said lever member along said guide groove; and
   said slider has a hole therein and wherein a fulcrum shaft is inserted in said hole for pivotally supporting said lever member at said fulcrum point.

7. A press apparatus comprising:
   a base;
   a main body mounted on said base;
   a driving mechanism for generating a driving force, said driving mechanism including a motor mounted in the main body;
   a pressing head for pressing a work piece to be pressed; and
   a movable fulcrum type lever device coupled between said driving mechanism and said pressing head for transmitting the driving force generated from said driving mechanism to said pressing head;
   said movable fulcrum type lever device comprising:
   a lever member having a force point coupled to said driving mechanism, a fulcrum point, and an action point coupled to said pressing head;
   fulcrum means for pivotally supporting said lever member at said fulcrum point such that said lever member is swingable about said fulcrum point;
   fulcrum guide groove means including a guide groove extending linearly in a longitudinal direction of said lever member for guiding said fulcrum means movably in the longitudinal direction crossing a swinging direction of said lever member along said guide groove;
   a force point regulator connected to said force point of said lever member for applying the driving force as a swinging force to said lever member crossing the longitudinal direction of said lever member; and
   an action point regulator connected to said action point of said lever member for applying an action force to the work piece through said pressing head.

* * * * *